United States Patent [19]

Büch et al.

[11] Patent Number: 5,138,041

[45] Date of Patent: Aug. 11, 1992

[54] WATER-SOLUBLE FIBER-REACTIVE MONOAZO AND DISAZO DYESTUFFS HAVING A S-TRIAZINYLAMINO GROUP AND THREE FIBER-REACTIVE GROUPS OF THE VINYLSULFONE SERIES

[75] Inventors: Holger M. Büch; Werner H. Russ, both of Hofheim am Taunus; Horst Tappe, Dietzenbach, all of Fed. Rep. of Germany

[73] Assignee: Hoechst Aktiengesellschaft, Frankfurt am Main, Fed. Rep. of Germany

[21] Appl. No.: 629,257

[22] Filed: Dec. 18, 1990

Related U.S. Application Data

[63] Continuation of Ser. No. 461,115, Jan. 4, 1990, abandoned.

[30] Foreign Application Priority Data

Jan. 4, 1989 [DE] Fed. Rep. of Germany ....... 3900114
Jan. 25, 1989 [DE] Fed. Rep. of Germany ....... 3902030

[51] Int. Cl.$^5$ .................... C09B 62/507; D06P 1/384
[52] U.S. Cl. .................................. 534/642; 534/629
[58] Field of Search .......................................... 534/642

[56] References Cited

U.S. PATENT DOCUMENTS

| | | | |
|---|---|---|---|
| 4,701,524 | 10/1987 | Kayane et al. | 534/642 |
| 4,775,746 | 10/1988 | Springer et al. | 534/642 |
| 4,812,558 | 3/1989 | Omura et al. | 534/642 X |
| 4,873,321 | 10/1989 | Omura et al. | 534/642 |
| 4,904,766 | 2/1990 | Yokogawa et al. | 534/642 |
| 4,908,436 | 3/1990 | Scheibli | 534/642 X |

FOREIGN PATENT DOCUMENTS 76782 3/1986 European Pat. Off. ............ 534/642

Primary Examiner—Mary C. Lee
Assistant Examiner—Fiona T. Powers

[57] ABSTRACT

Water-soluble dyes having fiber-reactive properties and conforming to the general formula (1)

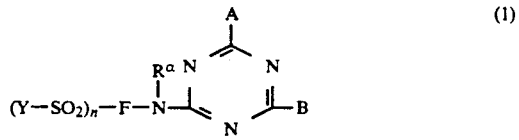

where
F is the radical of a metal-free or heavy metal complex monoazo or disazo dye which contains at least one sulfo group,
n is 1 or 2,
Y is vinyl, β-sulfatoethyl, β-haloethyl, β-thiosulfatoethyl, β-phosphatoethyl or β-acetoxyethyl,
$R^\alpha$ is hydrogen or lower alkyl which may be substituted by carboxy, sulfo, cyano, hydroxyl or chlorine,
A is a group of the general formula (2a) or (2b)

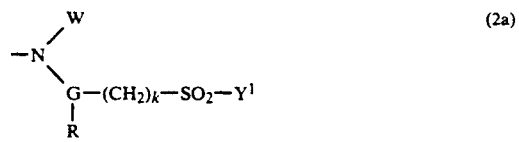

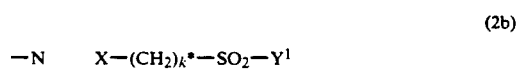

where
G is alkylene of 1 to 6 carbon atoms, alkylene of 2 to 6 carbon atoms which is interrupted by 1 or 2 hetero groups, or methyl-substituted cycloalkylene,
R is hydrogen, halogen, hydroxy, sulfato, cyano, carboxy, carbamoyl, lower carbalkoxy, lower alkanoylamino, substituted or unsubstituted benzoylamino or a group of the formula —SO$_2$—Y$^2$ where Y$^2$ has one of the meanings of Y or is β-hydroxyethyl,
k is zero, 1 or 2,
k* is zero, 1, 2, 3, or 4,
X forms together with the N-atom the bivalent radical of a heterocyclic ring,
Y$^1$ has one of the meanings specified for Y,
W is hydrogen, methyl, sulfomethyl, carboxymethyl, substituted or unsubstituted lower alkyl, substituted or methyl-substituted cycloalkylene or substituted or unsubstituted phenyl, and
B has one of the meanings specified for A.

The dyes of the general formula (1) make it possible to obtain strong, fast dyeings and prints on carboxamido-containing and/or hydroxy-containing materials, in particular fiber materials, such as wool, synthetic polyamide and in particular cellulose fiber materials.

21 Claims, No Drawings

WATER-SOLUBLE FIBER-REACTIVE MONOAZO AND DISAZO DYESTUFFS HAVING A S-TRIAZINYLAMINO GROUP AND THREE FIBER-REACTIVE GROUPS OF THE VINYLSULFONE SERIES

This application is a continuation of copending application Ser. No. 07/461,115, filed on Jan. 4, 1990 now abandoned.

The invention relates to the field of fiber-reactive dyes.

The practice of dyeing with reactive dyes has in recent years led to increased demands on the quality of the dyeings and the economics of the dyeing process. There consequently continues to be a demand for new reactive dyes which have improved properties, in particular application properties. The dyeing of cotton by the cold pad-batch process these days requires reactive dyes which are sufficiently substantive at the low dyeing temperature and which at the same time give good washing-off of the unfixed portions. Furthermore, they should be highly reactive, so that only short batching times are required, and they should produce in particular dyeings with high degrees of fixation. Known dyes, for example those described in European Patent Specification No. 0,076,782 B1, do not meet these requirements to a sufficient degree.

The present invention therefore has for its object to provide new, improved reactive dyes for the cold pad-batch process. They should in particular give high degrees of fixation and high fiber-dye bond stabilities and show good washing-off of the unfixed portions.

This object is achieved by the present invention by the discovery of dyes which conform to the general formula (1)

where

F is the radical of a metal-free or heavy metal complex monoazo or disazo dye which contains at least one sulfo group, n is 1 or 2, preferably 1, Y is vinyl, β-sulfatoethyl, β-haloethyl, such as β-chloroethyl, β-thiosulfatoethyl, β-phosphatoethyl or β-acetoxyethyl, preferably vinyl or particularly preferably β-sulfatoethyl, $R^a$ is hydrogen or straight-chain or branched alkyl of 1 to 4 carbon atoms which may be substituted by carboxy, sulfo, cyano, hydroxy or chlorine, preferably methyl, particularly preferably hydrogen, A is a group of the general formula (2a) or (2b)

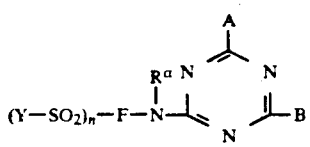

(2a)

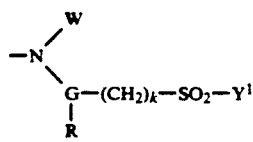

(2b)

where

G is straight-chain or branched alkylene of 1 to 6 carbon atoms, preferably of 2 to 4 carbon atoms, in particular of 3 carbon atoms, alkylene of 2 to 6 carbon atoms which is interrupted by 1 or 2 hetero groups, for example by oxygen or the amino group —NH—, the alkylene moieties being straight-chain or branched and preferably having 2 or 3 carbon atoms, or unsubstituted or methyl-substituted cycloalkylene of 5 to 8 carbon atoms, preferably cyclohexylene, R is hydrogen, chlorine, bromine or fluorine, hydroxy, sulfato, cyano, carboxy, carbamoyl, carbalkoxy of 2 to 5 carbon atoms, alkanoyloxy of 2 to 5 carbon atoms, benzoylamino which may be substituted by 1 or 2 substituents from the group consisting of sulfo, carboxy, methyl, ethyl, methoxy, ethoxy and chlorine, or a group of the general formula —SO$_2$—Y$^2$, where Y$^2$ has one of the meanings specified above for Y or is β-hydroxyethyl, Y$^2$ and Y being identical or different, k is zero, 1 or 2, k* is zero, 1, 2, 3 or 4, X is together with the N-atom the bivalent radical of a heterocyclic ring containing of 1 or 2 alkylene groups of 1 to 5 carbon atoms with or without 1 or 2 hetero atoms, such as nitrogen and oxygen atoms, for example piperazin-1,4-ylene or piperidinylene, Y$^1$ has one of the meanings specified above for Y, Y$^1$ being identical to or different from Y, preferably being vinyl, β-chloroethyl or β-sulfatoethyl, and W is hydrogen, methyl, sulfomethyl, carboxymethyl, straight-chain or branched alkyl of 2 to 6 carbon atoms, preferably of 2 to 4 carbon atoms, which may be substituted by 1 or 2 substituents from the group consisting of methoxy, ethoxy, carboxy, sulfo, hydroxy and halogen, such as chlorine and bromine, unsubstituted on methyl-substituted cycloalkylene of 5 to 8 carbon atoms, such as cyclohexylene, or phenyl which may be substituted by substituents from the group consisting of alkyl of 1 to 4 carbon atoms, such as methyl and ethyl, alkoxy of 1 to 4 carbon atoms, such as methoxy and ethoxy, carboxy, sulfo and halogen, such as chlorine, and B has one of the meanings specified for A, A and B having meanings identical to or different from each other.

Heavy metal monoazo and disazo dyes from which F is derived are in particular copper, nickel, cobalt and chromium complex dyes. The dye radical F preferably contains 2 to 6, in particular 2 to 4, sulfo groups.

Besides hydrogen and methyl the meanings of $R^a$ are in particular ethyl, 1-propyl, 2-propyl, 1-butyl, 2-methyl-1-propyl, tert-butyl, carboxymethyl, sulfomethyl, β-sulfoethyl, β-cyanoethyl, β-chloropropyl and β-hydroxyethyl.

Preferably, W is methyl or ethyl or particularly preferably hydrogen.

The substituents "sulfo", "carboxy", "phosphato", "thiosulfato" and "sulfato" include not only their acid forms but also their salt forms. Accordingly, sulfo groups are groups conforming to the general formula —SO₃M, carboxy groups are groups conforming to the general formula —COOM, phosphato groups are groups conforming to the general formula —OPO₃M₂, thiosulfato groups are groups conforming to the general formula —S—SO₃M and sulfato groups are groups conforming to the general formula —OSO₃M, in each of which M is hydrogen or an alkali metal, such as sodium, potassium or lithium.

Dyes conforming to the general formula (1) according to the invention are in particular those monoazo and disazo dyes, and the heavy metal complexes derived therefrom, conforming to the general formulae (3a) or (3b)

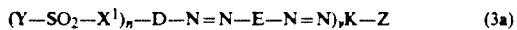  (3a)

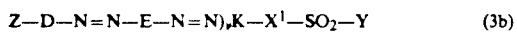  (3b)

where
Y and n are each as defined above,
X¹ is a direct bond or a bridge member, for example an alkylene group of 1 to 4 carbon atoms or the bivalent radical of an alkanoylamido group of 2 to 5 carbon atoms,
n is 1 or 2, preferably 1,
Z is a group of the general formula (4)

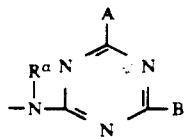  (4)

where Rᵅ, A and B are each as defined above,
D is the radical of a benzene or naphthalene series diazo component customary in azo chemistry which may contain substituents customary for azo dyes, for example sulfo, carboxy, hydroxy, amino, methyl, ethyl, methoxy, ethoxy, substituted or unsubstituted alkanoylamino of 2 to 4 carbon atoms, substituted or unsubstituted benzoylamino or halogen,
K is the radical of a benzene, naphthalene, pyrazolone, 6-hydroxy-2-pyridone or acetoacetarylamide series coupling component customary in azo chemistry which may contain substituents customary for azo dyes, for example hydroxy, sulfo, carboxy, amino, methyl, ethyl, methoxy, ethoxy, substituted or unsubstituted alkanoylamino of 2 to 4 carbon atoms, substituted or unsubstituted benzoylamino or halogen,
E is the radical of a benzene or naphthalene series middle component customary in disazo dyes which may be substituted by substituents customary for azo dyes, for example sulfo, carboxy, hydroxy, methyl, ethyl, methoxy, ethoxy, substituted or unsubstituted alkanoylamino of 2 to 4 carbon atoms, substituted or unsubstituted ureido, substituted or unsubstituted benzoylamino or halogen,
v is zero or 1, and
D, E and K together contain at least one, preferably at least two sulfo groups, preferably 3 or 4 sulfo groups.

Of the dyes according to the invention, notable dyes are in particular those which conform to the general formulae (5a), (5b), (5c) and (5d)

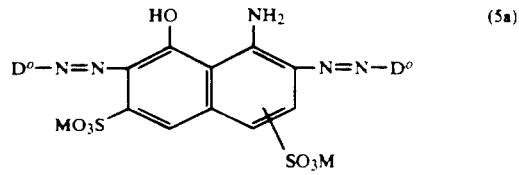  (5a)

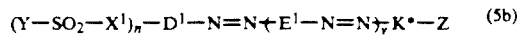  (5b)

  (5c)

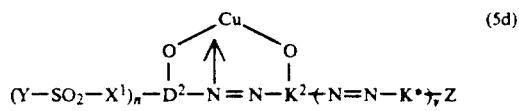  (5d)

where
Y, M, n, v and Z are each as defined above,
X¹ is as defined above, preferably a group of the formula —(CH₂)₃—CO—NH— or particularly preferably a direct bond,
X² has one of the meanings specified for X¹ and preferably is a group of the formula —NH—CO—(CH₂)₃— or particularly preferably a direct bond,
D⁰ is a radical of the general formula (6a), (6b) or (6c)

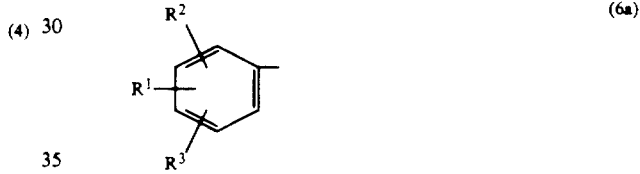  (6a)

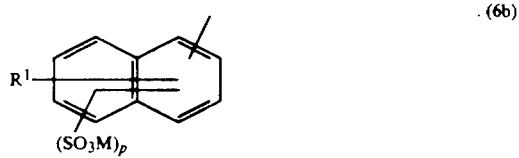  (6b)

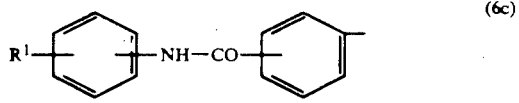  (6c)

where
R¹ in the one D⁰ is one or two groups of the abovementioned and above-defined general formula Y—SO₂—X¹—, where —X¹— has one of the abovementioned meanings, in particular a preferred meaning, and R¹ in the other D⁰ is a radical Z of the general formula (4),
R² is hydrogen, methyl, ethyl, methoxy, ethoxy, alkanoyl of 2 to 5 carbon atoms, such as acetyl or propionyl, cyano, carboxy, sulfo, alkoxycarbonyl of 2 to 5 carbon atoms, carbamoyl, N-(C₁-C₄-alkyl)carbamoyl, fluorine, chlorine, bromine or trifluoromethyl,
R³ is hydrogen, methyl, ethyl, methoxy, ethoxy, cyano, carboxy, sulfo, alkanoylamino of 2 to 5 carbon atoms, such as acetylamino, alkoxycarbonyl of 2 to 5 carbon atoms, carbamoyl, N-(C₁-C₄-alkyl)carbamoyl, fluroine, chlorine, nitro, sulfamoyl, N-(C₁-C₄-alkyl)sulfamoyl, alkylsulfonyl of 1 to 4 carbon atoms, phenylsulfonyl or phenoxy, p is zero, 1 or 2 (if zero, the group being hydrogen) and M is as defined above, $D^1$ is phenylene with the abovementioned and above-defined substituents $R^2$ and $R^3$ or is naphthylene which may be substituted by 1 or 2 sulfo groups, $E^1$ is a radical of the general formula (7a), (7b), (7c) or (7d)

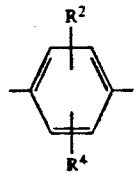
(7a)

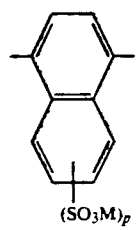
(7b)

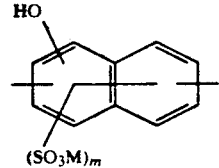
(7c)

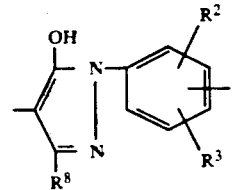
(7d)

where $R^2$, $R^3$, M and p are each as defined above, $R^4$ is hydrogen, alkyl of 1 to 4 carbon atoms, such as methyl or ethyl, alkoxy of 1 to 4 carbon atoms such as methoxy or ethoxy, chlorine, alkanoylamino of 2 to 5 carbon atoms, such as acetylamino or propionylamino, benzoylamino, ureido, N'-phenylureido, N'-alkylureido having 1 to 4 carbon atoms in the alkyl moiety, phenylsulfonyl or alkylphenylsulfonyl of 1 to 4 carbon atoms, m is 1 or 2, and $R^8$ is hydrogen, alkyl of 1 to 4 carbon atoms, such as methyl, cyano, carboxy, carbalkoxy of 2 to 5 carbon atoms, carbamoyl or phenyl, but preferably is methyl, carboxy or carbalkoxy of 2 to 5 carbon atoms, such as carbomethoxy or carboethoxy, —K*—Z is a radical of the general formula (8a), (8b), (8c), (8d), (8e) or (8f)

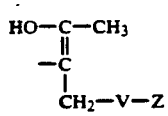
(8a)

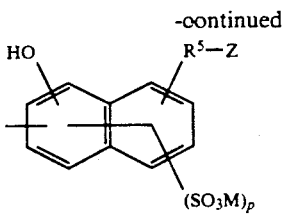
(8b)

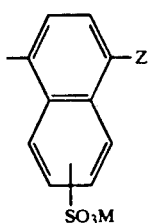
(8c)

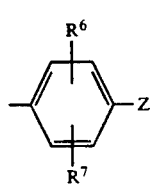
(8d)

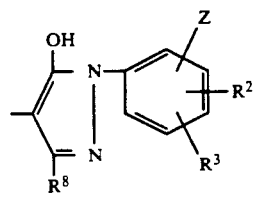
(8e)

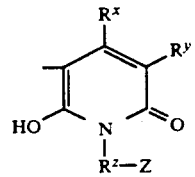
(8f)

where $R^1$, $R^2$, $R^3$, Z, p and M are each as defined above and the hydroxy group in the formula (8b) is ortho to the free bond attached to the azo group, V is a phenylene radical which contains the abovementioned and above-defined radicals $R^2$ and $R^3$ or is a naphthylene radical which may be substituted by 1 or 2 sulfo groups, $R^5$ is a direct bond or a radical of the formula —NH—CO-phenylene, —NH—CO—NH-phenylene, —N(CH$_3$)—CO-phenylene or —N(CH$_3$)—CO—NH-phenylene, $R^6$ is hydrogen, alkyl of 1 to 4 carbon atoms, such as methyl or ethyl, alkoxy of 1 to 4 carbon atoms, such as methoxy or ethoxy, bromine, chlorine or alkanoylamino of 2 to 7 carbon atoms, such as acetylamino and propionylamino, $R^7$ is hydrogen, alkyl of 1 to 4 carbon atoms, such as methyl or ethyl, alkoxy of 1 to 4 carbon atoms, such as methoxy or ethoxy, chlorine or alkanoylamino of 2 to 7 carbon atoms, such as acetylamino or propionylamino, ureido or phenylureido, $R^8$ is as defined above, $R^x$ is hydrogen, alkyl of 1 to 4 carbon atoms, such as methyl, or alkyl substituted by alkoxy of 1 to 4 carbon atoms, such as methoxy, or by cyano, $R^y$ is hydrogen, sulfo, sulfoalkyl having an alkylene moiety of 1 to 4 carbon atoms, such as sulfomethyl, cyano or carbamoyl, and $R^z$ is alkylene of 1 to 6 carbon atoms, preferably of 1 to 4 carbon atoms, phenylene, which may be substituted by substituents from the group consisting of methyl, ethyl, chlorine, carboxy and sulfo, or alkylenephenylene having 2 to 4 carbon atoms in the alkylene moiety, D* is phenylene, which may be substituted by 1 or 2 substituents from the group consisting of hydrogen, methyl, ethyl, methoxy, bromine, chlorine, carboxy and sulfo, or naphthylene, which may be substituted by 1 or 2 sulfo groups, $K^1$ is a radical of the general formula (9a), (9b) or (9c)

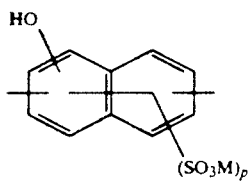 (9a)

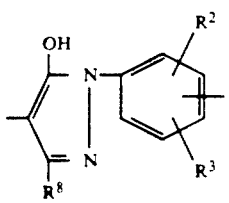 (9b)

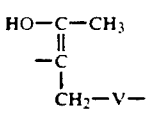 (9c)

where M, p, V, $R^2$, $R^3$ and $R^8$ are each as defined above and the hydroxy group in the formula (9a) is ortho to the free bond attached to the azo group, $D^2$ is a benzene radical, which may be substituted by 1 or 2 substituents from the group consisting of methyl, ethyl, methoxy, ethoxy, bromine, chlorine, carboxy or sulfo, or a naphthalene radical, which may be substituted by a sulfo group, and $K^2$ is a radical of the general formula (10a) or (10b)

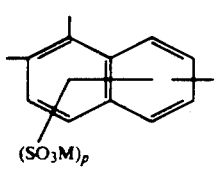 (10a)

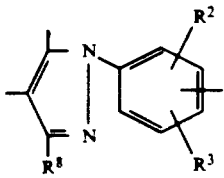 (10b)

where M, p, $R^2$, $R^3$ and $R^8$ are each as defined above.

In the dyes according to the invention, the radical Z of the general formula (4) is preferably a radical of the general formula (4A)

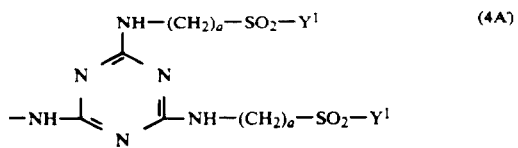 (4A)

where each a is 2 or preferably 3 and $Y^1$ is as defined above, each $Y^1$ preferably being vinyl, β-chloroethyl or β-sulfatoethyl.

Preference is accordingly given in particular to dyes of the general formula (1) and of the general formulae (3a), (3b), (5a), (5b), (5c) and (5d), where $R^a$ is hydrogen and A and B are identical to each other, each being a radical of the general formula —NH—(CH$_2$)$_a$—SO$_2$—$Y^1$, wherein a and $Y^1$ are each as defined, in particular preferred, above.

Of the dyes according to the invention, notable ones are further those conforming to the following general formulae (11a) to (11n):

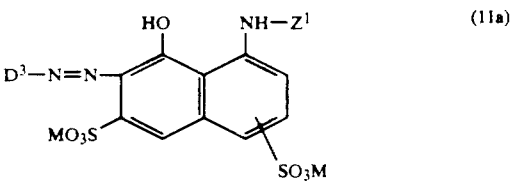 (11a)

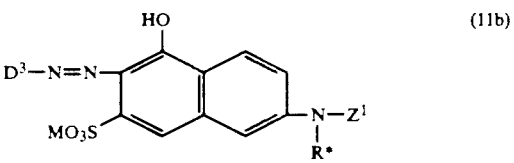 (11b)

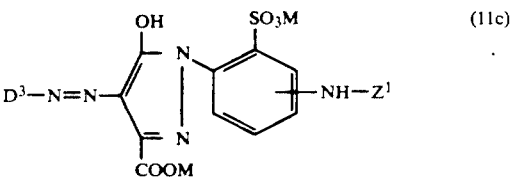 (11c)

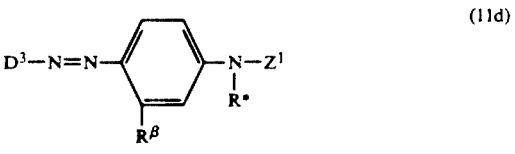 (11d)

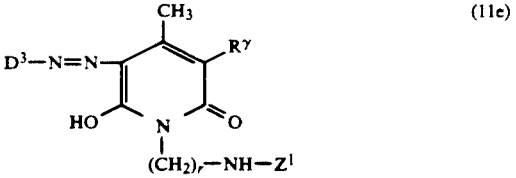 (11e)

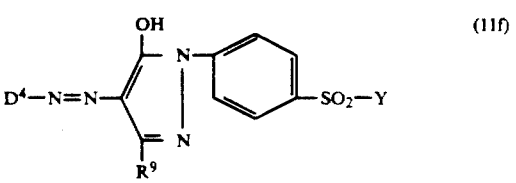 (11f)

-continued

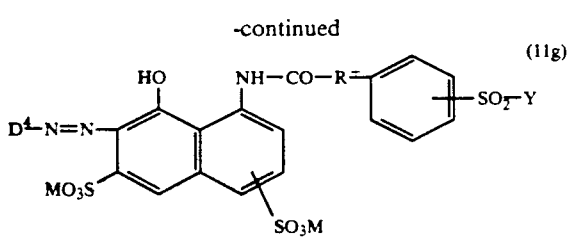
(11g)

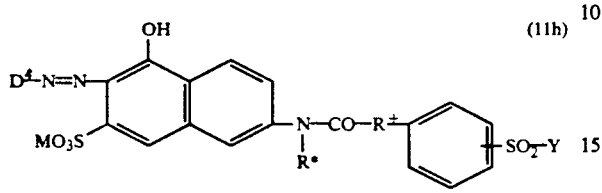
(11h)

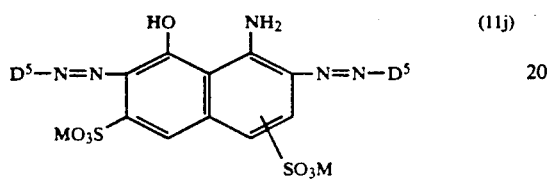
(11j)

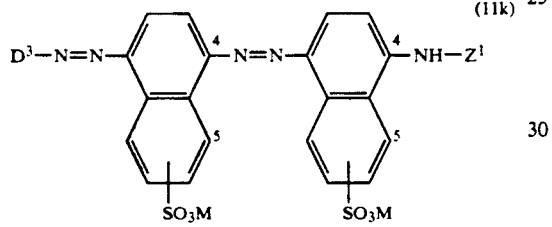
(11k)

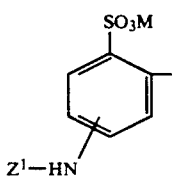
(11m)

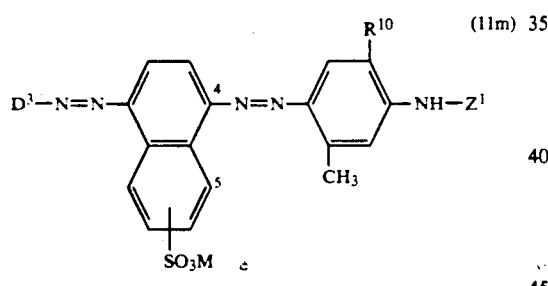

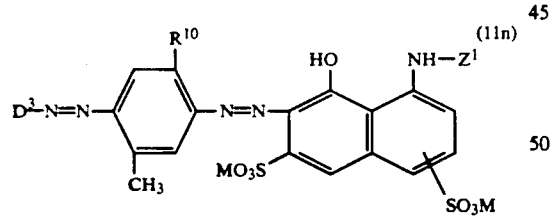
(11n)

In these formulae the symbols have the following meanings:

M is as defined above, preferably hydrogen or in particular sodium, potassium or lithium, $D^3$ is a phenyl or 2-naphthyl radical which is substituted by a group of the above-defined general formula —$SO_2$—Y and which may additionally be substituted by substituents as per groups $R^2$ and $R^3$ of the above definition, $D^3$ preferably being 4-($\beta$-sulfatoethylsulfonyl)phenyl, 4-(vinylsulfonyl)phenyl, 3-($\beta$-sulfatoethylsulfonyl)phenyl, 3-(vinylsulfonyl)-phenyl, 2-sulfo-4-($\beta$-sulfatoethylsulfonyl)phenyl, 2-sulfo-4-(vinylsulfonyl)phenyl, 4-methoxy-3-($\beta$-sulfatoethylsulfonyl)phenyl, 4-methoxy-3-(vinylsulfonyl)phenyl, 1-sulfo-6-($\beta$-sulfatoethylsulfonyl)-2-naphthyl or 1-sulfo-6-(vinylsulfonyl)-2-naphthyl, $Z^1$ is a group of the general formula (4a)

(4a)

where A and B are each as defined, in particular preferred, above, $R^*$ is hydrogen or methyl, $R^\beta$ is methyl, acetylamino or ureido, $R^\gamma$ is hydrogen, cyano or carbamoyl, r is 2 or 3, $D^4$ is a group of the general formula (12)

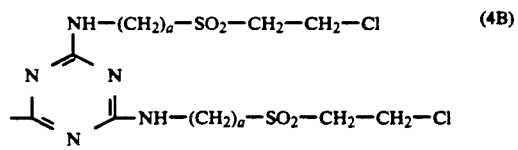
(12)

where M and $Z^1$ are each as defined above and $Z^1$—HN— is bonded to the benzene nucleus either para to the free bond attached to the azo group or para to the sulfo group, $R^9$ is methyl or carboxy, Y is as defined above, preferably vinyl or in particular $\beta$-sulfatoethyl, $R^+$ is a direct bond or the group —NH—, $D^5$ is in the one instance a radical $D^4$ of the abovementioned meaning and in the other a radical $D^3$ of the abovementioned meaning, $R^{10}$ is hydrogen, methyl or methoxy, and the sulfo group —$SO_3M$ in the formulae (11k) and (11m) is bonded to the naphthalene in the 5-, 6- or 8-position.

Of these compounds, notable ones are in particular those conforming to the general formula (11a) in which M is as defined, in particular preferred, above and $D^3$ is phenyl substituted para to the azo group by a group of the formula —$SO_2$— Y, where Y is as defined above, preferably vinyl or in particular $\beta$-sulfatoethyl, or $D^3$ is 1-sulfo-2-naphthyl substituted in the 6-position by —$SO_2$—Y, where Y is as defined above, preferably vinyl or in particular $\beta$-sulfatoethyl, and in which $Z^1$ is a radical of the general formula (4B)

$$NH-(CH_2)_a-SO_2-CH_2-CH_2-Cl \quad (4B)$$

(with triazine ring bearing NH—(CH$_2$)$_a$—SO$_2$—CH$_2$—CH$_2$—Cl)

where a is 2 or preferably 3.

Of the compounds of the general formula (11j) the preferred compound is in particular the compound of the formula (11p)

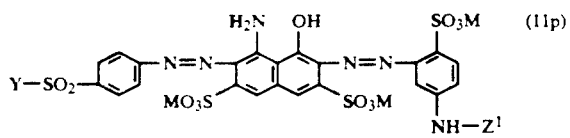 (11p)

where Y and M are each as defined, in particular preferred, above and $Z^1$ is a radical of the abovementioned and above-defined formula (4B).

Of the abovementioned compounds, interesting ones are furthermore those of the general formula (11b) in which in particular $D^3$ is phenyl substituted para to the azo group by a methoxy group and meta to the azo group by $-SO_2-Y$, where Y is as defined above, preferably vinyl or in particular $\beta$-sulfatoethyl, M is as defined, in particular preferred, above, $R^*$ is hydrogen and $Z^1$ is a group of the formula (4C)

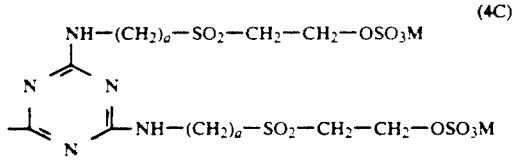 (4C)

where M and a are each as defined above.

The present invention further relates to processes for preparing the dyes according to the invention. For example, they can be prepared according to the invention in the manner of known processes for synthesizing azo dyes or heavy metal complexes thereof by converting dye intermediates familiar to the person skilled in the art, at least one of these dye intermediates containing a fiber-reactive grouping of the general formula (4) and at least one of the intermediates containing an $-SO_2-Y$ and/or $-SO_2-Y^2$ group. For instance, monoazo and disazo dyes of the general formula (1) can be synthesized by reacting their diazo and coupling components, which each contain a fiber-reactive group of the general formula (4) or the formula $-SO_2-Y$ or $-SO_2-Y^2$, by the usual method of diazotization and coupling. If disazo dyes are to be synthesized, the diazo or coupling component may already contain the second azo group. Diazo components usable according to the invention are the aromatic carbocyclic and heterocyclic amino compounds which are customary for fiber-reactive azo dyes and which may contain the fiber-reactive group of the general formula (4) or $-SO_2-Y$ or $-SO_2-Y^2$, and coupling components usable according to the invention are those coupling components customary for the synthesis of fiber-reactive azo dyes, for example of the naphthol, aniline, naphthylamine, aminonaphthol, pyrazolone or pyridone series, which contain the fiber-reactive group of the general formula $-SO_2-Y$ or $-SO_2-Y^2$ or of the general formula (4). Such diazo compounds are for example compounds which conform to the general formula $D^0-NH_2$ or $D^*-Z$ or $(Y^2-SO_2-X_1)_n-D^1-$ or $(Y^2-SO_2-X^1)_n-D^2(OH)-$ where $D^0$, $D^*$, Z, $Y^2$, $X^1$, n, $D^1$ and $D^2$ are each as defined above, and such coupling components are for example the following compounds of the general formulae (13a) to (13d) and (14a) to (14c):

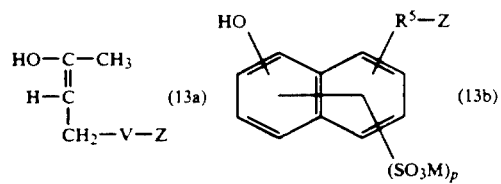

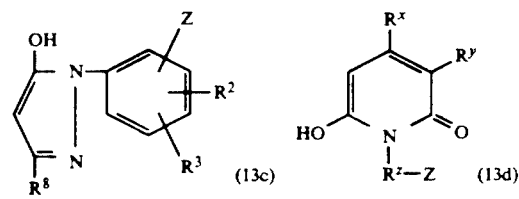

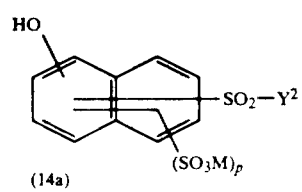

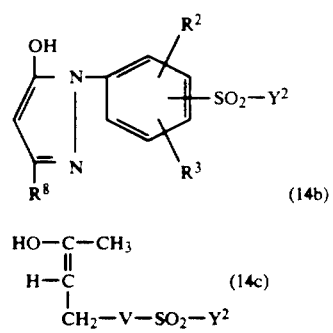

where Z, $Y^2$, V, $R^5$, M, p, $R^2$, $R^3$, $R^8$, $R^x$, $R^y$ and $R^z$ are each as defined above.

Further diazo components which according to the invention can be used for synthesizing of the dyes of the general formula (1) are for example diamino compounds of the general formula $H_2N-D-NH_2$ or $H_2N-D-*-NH_2$, where D and $D^*$ are each as defined above, or their monoacylamino derivatives (in which the acyl group acts as a customary protective group to prevent diazotization of the second amino group and is hydrolytically eliminatable in the conventional manner after diazotization and coupling). The aminoazo compounds obtainable with these diazo components can then be reacted according to the invention with a cyanuric halide or with a compound of the general formula $Z^1-$Hal, where $Z^1$ is as defined above and Hal is halogen, such as fluorine, bromine or chlorine, by the known methods of reacting amino compounds or aminoazo compounds with halotriazine derivatives.

The diazotization and coupling reactions are carried out in a conventional manner; for instance the diazotization in general at a temperature of between $-5°$ C. and $+15°$ C. and at a pH below 2 by means of a strong acid and an alkali metal nitrite in a preferably aqueous medium and the coupling reaction in general at a pH between 1.5 and 4.5 in the case of an amino-containing coupling component and at a pH between 3 and 7.5 in the case of a hydroxy-containing coupling component and at a temperature of between 0° and 25° C., again preferably in an aqueous medium.

The dyes according to the invention can likewise be prepared according to the invention by reacting a cyanuric halide, such as cyanuric fluoride, cyanuric bromide or cyanuric chloride, with a compound of the general formula (15)

where F, Y, $R^a$ and n are each as defined above, and one or two amino compounds of the general formula (16)

where A has one of the abovementioned meanings, including another meaning as per the radical B, in any desired order. For instance, first an amino compound of the general formula (15) can be reacted with a cyanuric halide, preferably cyanuric chloride or cyanuric fluoride, to give a dihalotriazinylamino compound of the general formula (17)

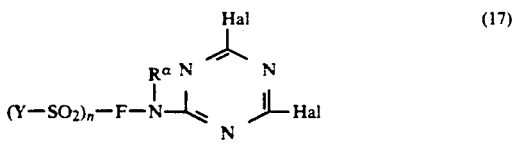

where Hal is halogen, preferably chlorine or fluorine, and F, Y, $R^a$ and n are each as defined above, and this product is converted by reaction with one or two amino compounds of the general formula (16) in an equivalent amount into the final dye (1), or first an amino compound of the general formula (16) is reacted with a cyanuric halide to give a halotriazinylamino compound of the general formula (18a) or (18b)

where Hal, A and B are each as defined above and this product is converted in an equivalent amount with a compound of the general formula (15) into the final dye (1). The condensation reactions between the cyanuric halide or the halotriazinylamino compounds (17) and (18) with the amino compounds (15) and/or (16) can be carried out in the usual manner of the reaction of a cyanuric halide or halotriazinylamino compound with an amino compound, for instance in an organic or preferably aqueous organic medium, particularly preferably in an aqueous medium in the presence of an acid-binding agent, such as an alkali metal or alkaline earth metal carbonate, an alkali metal or alkaline earth metal bicarbonate or hydroxide or an alkali metal acetate, the alkali and alkaline earth metals preferably being sodium, potassium or calcium. Acid-binding agents also include tertiary amines, for example pyridine, triethylamine or quinoline. If these condensation reactions are carried out in an organic or aqueous organic medium, the organic solvent (content) is acetone, dioxane or dimethylformamide.

The condensation reactions between the cyanuric halide and the amino compounds generally take place at a temperature between $-10°$ C. and $+70°$ C., preferably between $-5°$ C. and $+30°$ C., and at a pH between 1.5 and 12, preferably between 4.5 and 8. The reaction of the halotriazinylamino compounds of the general formulae (17) or (18) with an amino compound of the general formula (15) or (16) is carried out for example at a temperature between 0° and 70° C., preferably between 10° and 50° C., and at a pH between 2 and 8, preferably between 4 and 7.

With the condensation reactions care must be taken to ensure that the fiber-reactive groupings are not damaged in the alkaline range.

Those dyes according to the invention where $-SO_2-Y$ is $\beta$-sulfatoethylsulfonyl or $\beta$-phosphatoethylsulfonyl can also be prepared according to the invention by reacting a dye of the general formula (1) of the same structure except that one or more of the formulae Y, $Y^1$ and $Y^2$ is $\beta$-hydroxyethyl in a known manner with a sulfating agent or phosphating agent, such as concentrated sulfuric acid, $SO_3$-containing sulfuric acid, aqueous concentrated phosphoric acid or polyphosphoric acid, sulfation generally taking place at a temperature between 10° C. and 25° C. and phosphation at a temperature between 20° and 100° C.

The starting dyes with the $\beta$-hydroxyethylsulfonyl groups are synthesizable similarly to the above directions for the preparations of the dyes according to the invention by either using corresponding dye intermediates which contain these $\beta$-hydroxyethylsulfonyl groups or reacting an amino dye of the general formula (15) and an amino compound of the general formula (16) where however Y is $\beta$-hydroxyethyl with a cyanuric halide under the above reaction conditions.

In the synthesis of heavy metal complex azo dyes according to the invention, for example those conforming to the general formulae (5d), the starting materials are in general those azo compounds free of heavy metal which contain in the coupling component an attached phenolic or naphtholic hydroxy group ortho or vicinally to the azo group and whose diazo component radical contains attached ortho to the azo group a hydrogen atom or a hydroxy group or a lower alkoxy group, such as methoxy, and which in addition contain an attached acylamino radical, such as an acetylamino conforming to the general formula $-N(R^a)$-acyl, where acyl is the acyl radical of an organic acid, such as a lower alkanecarboxylic acid, and $R^a$ is as defined above, for example a starting compound conforming to the general formula (20)

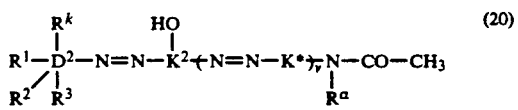

where $R^1$, $R^2$, $R^3$, $D^2$, $K^2$, $K^*$, v and $R^a$ are each as defined above and $R^k$ is hydrogen or a hydroxy or methoxy group attached to $D^2$ ortho to the azo group, and this acylamino-containing starting azo compound is reacted by known and customary methods with a heavy metal donor, such as a heavy metal salt, or else, if a copper complex azo dye is to be formed, is subjected to a conventional oxidative or dealkylating coppering reaction. The resulting acylamino-containing heavy metal complex azo compounds can then be reacted by known methods, with hydrolysis of the acylamino group to an amino group, with a cyanuric halide and an amino compound conforming to the general formula (16) to give the dyes of the general formula (1) according to the invention.

Dyes conforming to the general formula (1) according to the invention where one or more of Y, $Y^1$ and $Y^2$ are vinyl can also be prepared according to the invention from dyes conforming to the general formula (1) where at least one of Y, $Y^1$ and $Y^2$ is $\beta$-sulfatoethyl or $\beta$-haloethyl by converting the $\beta$-sulfatoethyl or $\beta$-haloethyl group by treatment with an aqueous alkali, for example sodium bicarbonate or sodium hydroxide, for instance in an aqueous medium at a temperature of 50° to 60° C. and a pH of 9 to 11, into a vinyl group.

The starting compounds of the general formula (16) are known for example from German Patent Specification 2,614,550 and from European Patent Specification No. 0,076,782 mentioned at the beginning. Compounds not explicitly described therein can be prepared in a similar manner familiar to the chemist, for example as per the relevant direction in German Patent Specification No. 887,505.

Aromatic amines conforming to the general formula $(Y-SO_2-X^1-)_n-D-NH_2$ for use as diazo components in the monoazo and disazo dyes according to the invention and for use as starting compounds for synthesizing these dyes are for example 4-VS-aniline (where VS is here and hereinafter a group of the general formula $-SO_2-Y^2$ where $Y^2$ is as defined above), 3-VS-aniline, 2-bromo-4-VS-aniline, 2-sulfo-5-VS-aniline, 2-sulfo-4-VS-aniline, 2-methoxy-5-VS-aniline, 2-methoxy-5-methyl-4-VS-aniline, 2,5-dimethoxy-4-VS-aniline, 2-hydroxy-5-VS-aniline, 4-chloro-3-VS-aniline, 2-chloro-5-VS-aniline, 3,4-di-VS-aniline, 2,5-di-VS-aniline, 4-($\beta$-sulfatoethylamino)-3-VS-aniline, 2-($\beta$-sulfatoethylamino)-5-VS-aniline, 4-($\beta$-succinylamidoethylamido)-3-VS-aniline, 4-(3'-VS-benzoylamido)aniline, 3-(3'-VS-benzoylamido)aniline, 6-VS-2-naphthylamine, 8-VS-2-naphthylamine, 1-sulfo-6-VS-2-naphthylamine, 6-sulfo-8-VS-2-naphthylamine, 6-sulfo-8-VS-1-hydroxy-2-naphthylamine, 2-amino-4,4'-di-VS-diphenyl, 2-sulfo-5-[$\gamma$-($\beta'$-chloroethylsulfonyl)butyrylamino]aniline, 2-sulfo-5-[$\gamma$-(vinylsulfonyl)butyrylamino]-aniline, 2-sulfo-4-[$\gamma$-($\beta'$-chloroethylsulfonyl)butyryl-amino]aniline and 2-sulfo-4-[$\gamma$-(vinylsulfonyl)butyryl-amino]aniline.

Starting compounds conforming to the general formula $H_2N-D-NH_2$ or $H_2N-D^*-NH_2$ are for example 1,4-phenylenediamine, 1,4-phenylenediamine-2-sulfonic acid, 1,4-phenylenediamine-2-carboxylic acid, 1,4-diaminonaphthalene-2-sulfonic acid, 2,6-diaminonaphthalene-8-sulfonic acid, 2,6-diaminonaphthalene-4,8-disulfonic acid, 1,3-phenylenediamine, 1,3-phenylenediamine-4-sulfonic acid, 1,3-phenylenediamine-4,6-disulfonic acid, 1,4-phenylenediamine-2,6-disulfonic acid, 1,4-phenylenediamine-2,5-disulfonic acid, 1,4-diaminonaphthalene-6-sulfonic acid, 4,4'-diaminobiphenyl-3-sulfonic acid and 4,4'-diaminostilbene-2,2'-disulfonic acid.

Starting compounds conforming to the general formula $H-E-NH_2$ or $H-E^1-NH_2$ which can be used for synthesizing the diazo dyes according to the invention and which act not only as coupling components but subsequently to the coupling as diazo components are for example aniline, 3-methylaniline, 2,5-dimethylaniline, 2,5-dimethoxyaniline, 3-methoxyaniline, 3-acetylaminoaniline, 3-propionylaminoaniline, 3-butyrylaminoaniline, 3-benzoylaminoaniline, 3-ureidoaniline, 2-methyl-5-acetylaminoaniline, 2-methoxy-5-acetylaminoaniline, 2-methoxy-5-methylaniline, 1-aminonaphthalene-6-sulfonic acid, 1-aminonaphthalene-7-sulfonic acid, 2-sulfo-5-acetylaminoaniline, 2-amino-5-naphthol-7-sulfonic acid, 2-amino-8-naphthol-6-sulfonic acid, 2-(4'-aminobenzoylamino)-5-naphthol-7-sulfonic acid, 1-(4'-amino-2-sulfophenyl)-3-methyl- or -3-carboxy-5-pyrazolone and N-(3-sulfo-4-amino)acetoacetanilide.

Starting compounds for use as coupling components conforming to the general formula $H-K^1-X^2-SO_2-Y^2$ or $H-K-X^1-SO_2-Y^2$ for synthesizing the dyes according to the invention are for example 1-[4'-($\beta$-sulfatoethylsulfonyl)phenyl]-3-methyl-5-pyrazolone, 1-[4'-(vinylsulfonyl)phenyl]-3-methyl-5-pyrazolone, 1-[4'-(vinylsulfonyl)phenyl]-3-carboxy-5-pyrazolone, 1-[3'-($\beta$-chloroethylsulfonyl)benzoylamino]-3,6-disulfo-8-naphthol, 1-[3'-(vinylsulfonyl)benzoylamino]-3,6-disulfo-8-naphthol, 1-[3'-(vinylsulfonyl)benzoylamino]-4,6-disulfo-8-naphthol, 1-[3'-($\beta$-sulfatoethylsulfonyl)benzoylamino]-4,6-disulfo-8-naphthol, 2-[3'-($\beta$-chloroethylsulfonyl)benzoylamino]-6-sulfo-8-naphthol, 2-[3'-(vinylsulfonyl)benzoylamino]-6-sulfo-8-naphthol, 3-[3'-($\beta$-chloroethylsulfonyl)benzoylamino]-6-sulfo-8-naphthol, 3-[3'-(vinylsulfonyl)benzoylamino]-6-sulfo-8-naphthol, 2-[N-methyl-N-($\beta$-sulfatoethylsulfonyl)amino]-6-sulfo-8-naphthol, 3-[N-methyl-N-($\beta$-sulfatoethylsulfonyl)amino]-6-sulfo-8-naphthol, 2-[N-ethyl-N-($\beta$-sulfatoethylsulfonyl)amino]-6-sulfo-8-naphthol, 1-[N'-(3'-$\beta$-chloroethylsulfonylphenyl)ureido]-3,6-disulfo-8-naphthol, 1-[N'-(3'-vinylsulfonylphenyl)ureido]-3,6-disulfo-8-naphthol, 1-[N'-(3'-vinylsulfonylpropyl)ureido]-3,6-disulfo-8-naphthol, 1-[N'-(3'-$\beta$-chloroethylsulfonylphenyl)ureido]-4,6-disulfo-8-naphthol, 1[N'-(3'-vinylsulfonylphenyl)ureido]-4,6-disulfo-8-naphthol, 1-[N'(3'-$\beta$-chloroethylsulfonylpropyl)ureido]-4,6-disulfo-8-naphthol, 2-[N'-($\_$'-$\beta$-sulfatoethylsulfonylphenyl)ureido]-6-sulfo-8-naphthol, 2-[N'-(3'-$\beta$-chloroethylsulfonylpropyl)ureido]-6-sulfo-8-naphthol, 3-[N'-(3'-$\beta$-chloroethylsulfonylphenyl)ureido]-6-sulfo-8-naphthol, 3-[N'-(3'-vinylsulfonylpropyl)ureido]-6-sulfo-8-naphthol, 2-sulfo-5-[N'-(3''-chloroethylsulfonyl)phenyl]-ureidoaniline and 3-[N'-(3''-$\beta$-sulfatoethylsulfonyl)phenyl]ureidoaniline.

Coupling components conforming to the general formula $H-K-NHR^a$ or $H-K^*-NHR^a$ for use in the synthesis of azo dyes according to the invention where the fiber-reactive radical of the general formula (4) is present in the coupling component into whose amino group $-NHR^a$ this fiber-reactive radical can subsequently be introduced are for example aniline, 3-methylaniline, 2,5-dimethylaniline, 2,5-dimethoxyaniline, 3-methoxyaniline, 3-acetylaminoaniline, 3-propionylamionoaniline, 3-butyrylaminoaniline, 3-benzoylaminoaniline, 3-ureidoaniline, 2-methyl-5-acetylaminoaniline, 2-methoxy-5-acetylaminoaniline, 2-methoxy-5-methylaniline, 1-aminonaphthalene-6-sulfonic acid, 1-amino-7-sulfonic acid, 1-aminonaphthalene-8-sulfonic acid, 2-sulfo-5-acetylaminoaniline, 2-amino-5-naphthol-7-sulfonic acid, 2-amino-8-naphthol-6-sulfonic acid, 2-(4'-aminobenzoylamino)-5-naphthol-7-sulfonic acid, 1-(4'-amino- or -acetylamino-2-sulfophenyl)-3-methyl- or -3-carboxy-5-pyrazolone, N-(3-sulfo-4-amino)acetoacetanilide, 1-amino-8-naphthol-3,6- or -4,6-disulfonic acid, 1-(3'- or 1-(4'-aminobenzoyl)amino-8-naphthol-3,6- or -4,6-disulfonic acid, 1-acetylamino-8-naphthol-3,6- or -4,6-disulfonic acid, 2-acetylamino-5-naphthol-7-sulfonic acid, 2-acetylamino-8-naphthol-6-sulfonic acid, 3-acetylamino-8-naphthol-6-sulfonic acid, 3-(N-methylamino)-8-naphthol-6-sulfonic acid, 1-(3'-amino- or -acetylamino-6'-sulfophenyl)-3-methyl- or -3-carboxy-5-pyrazolone, 2-(N-methyl-N-acetylamino)- or -methylamino-5-naphthol-7-sulfonic acid, N-methylaniline and N-propyl-m-toluidine.

Starting compounds conforming to the general formula (16) are for example γ-(β'-chloroethylsulfonyl)-propylamine, γ-(β'-sulfatoethylsulfonyl)propylamine, γ-(β'-hydroxyethylsulfonyl)propylamine, vinylsulfonyl)-propylamine, N-ethyl-β-(β'-chloroethylsulfonyl)ethylamine, N-ethyl-γ-(β'-chloroethylsulfonyl)propylamine, N-ethyl-γ-(β'-sulfatoethylsulfonyl)propylamine, N-ethyl-γ-(β'-hydroxyethylsulfonyl)propylamine, N-ethyl-γ-(vinylsulfonyl)propylamine, bis-γ-[(β-chloroethylsulfonyl)propyl]amine, bis-γ-[(β-hydroxyethylsulfonyl)propyl]amine, β-hydroxy-γ-(β'-chloroethylsulfonyl)propylamine, β,γ- di-(β'-chloroethylsulfonyl)propylamine, β-acetoxy-γ-(β'-acetoxyethylsulfonyl)propylamine, β-chloro-γ-(β'-chloroethylsulfonyl)propylamine, β-bromo-γ-(β'-chloroethylsulfonyl)propylamine, β-sulfato-γ-(β'-sulfatoethylsulfonyl)propylamine, bis[β-hydroxy-γ-(β'-chloroethylsulfonyl)propyl]amine, bis[β-chloro-γ-(β'-chloroethylsulfonyl)propyl]amine, bis[β-sulfato-γ-(β'-sulfatoethylsulfonyl)propyl]amine, β-hydroxy-γ-(vinylsulfonyl)propylamine, β-[β'-(β''-chloroethylsulfonyl)ethoxy]ethylamine, 4-(β-chloroethylsulfonyl)cyclohexylamine, 4-(β-sulfatoethylsulfonyl)cyclohexylamine, 4-(β-sulfatoethylsulfonyl)piperidine, 4-(vinylsulfonyl)piperidine, N'-[γ-(β'-chloroethylsulfonyl)propyl]piperazine, 2-[β-(β'-chloroethylsulfonyl)ethyl]piperidine and 3-[(β-sulfatoethylsulfonyl)methyl]]piperidine.

Bivalent coupling components suitable for synthesizing those disazo dyes in which the bivalent coupling radical is bonded to two diazo components of which one contains a fiber-reactive radical of the general formula Y—SO$_2$—X$^1$— and the other contains a fiber-reactive radical of the general formula (4) are for example resorcinol, 5,5'-dihydroxy-7,7'-disulfo-2,2'-dinaphthylurea and in particular 1-amino-8-naphthol-3,6-disulfonic acid and 1-amino-8-naphthol-4,6-disulfonic acid.

The dyes conforming to the general formula (1) according to the invention are suitable for use as fiber-reactive dyes for dyeing and printing hydroxy-containing fibers, such as cellulose fiber materials, in particular cotton, but also synthetic or natural polyamide fibers such as wool. Suitable dyeing methods are the known dyeing and printing methods for fiber-reactive dyes, in particular those for fiber-reactive dyes which contain a combination of fiber-reactive groups of the fluorotriazine and vinyl sulfone series. Such methods have been repeatedly described in the general and patent literature.

In particular, the dyes according to the invention are usable with advantage in the cold pad-batch process, since they are notable for a uniformly high yield of fixation. They can also be applied with advantage by dyeing by the customary exhaust methods and also by the one-bath pad-steam processes, the two-bath pad-batch processes and the two-bath pad-steam processes. Equally, in printing they give uniformly high yields of fixation, independently of the method of fixation, which may be effected for example by steaming or by dry heat. The dyeings and prints obtainable according to the invention are of high brilliance and color strength. They have good light fastness properties, even in the wet state, and good wet fastness properties, such as good fastness in the 60° C. and 95° C. wash and good fastness to seawater, acid and alkaline perspiration and chlorinated water, but also a good peroxide fastness and fastness to gas fume fading. The dyes are also notable for imperviousness to atmospheric influences. Moreover, they produce good dyeings on polyamide fiber material, such as wool, which have in particular good light fastness and especially good wash and perspiration fastness properties. Furthermore, their buildup is good.

The Examples which follow serve to illustrate the invention. Parts and percentages are by weight, unless otherwise stated. Parts by weight bear the same relation to parts by volume as the kilogram to the liter. The compounds described in the Examples by means of formulae are shown in the form of the free acids; in general, they are prepared and isolated in the form of their sodium or potassium salts and used for dyeing in the form of their salts. It is similarly possible to use the free acid starting compounds and components mentioned in the Examples, in particular the Table Examples, in the synthesis in that free acid form or in the form of their salts, preferably alkali metal salts.

The absorption maxima ($\lambda_{max}$) in the visible region reported for the compounds according to the invention were determined on aqueous solutions of their alkali metal salts. In the Table Examples, the $\lambda_{max}$ values are given in brackets next to the hue; the wavelength is given in nm.

EXAMPLE 1

14.2 parts of cyanuric fluoride are gradually added over 5 minutes at 0° C. and a pH of 4.5 to a neutral solution of 31.9 parts of 1-amino-3,6-disulfo-8-naphthol in 800 parts of water. 22.3 parts of γ-(β'-chloroethylsulfonyl)propylamine hydrochloride are then added while the pH is maintained at 7 and the temperature at 5° to 15° C., and stirring is continued for some time thereafter. A further 22.3 parts of this propylamine hydrochloride are then added at 50°–55° C. and a pH of 6.5 and stirring is continued at that temperature and a pH of 6.5 for a further 4 hours. The batch then has added to it at 15° to 30° C. the aqueous hydrochloric acid solution of the diazonium salt of 51.1 parts of 1-sulfo-2-amino-6-(β-sulfatoethylsulfonyl)naphthalene, and the coupling reaction is carried out at a pH of 6.

The resulting monoazo dye according to the invention is isolated from the synthesis solution by spray drying at a pH of 7. It has very good dye properties and applied to the fiber materials mentioned in the description, in particular cotton, by the application and fixing methods customary for fiber-reactive dyes produces strong red dyeings. Written in the form of the free acid the dye has the formula:

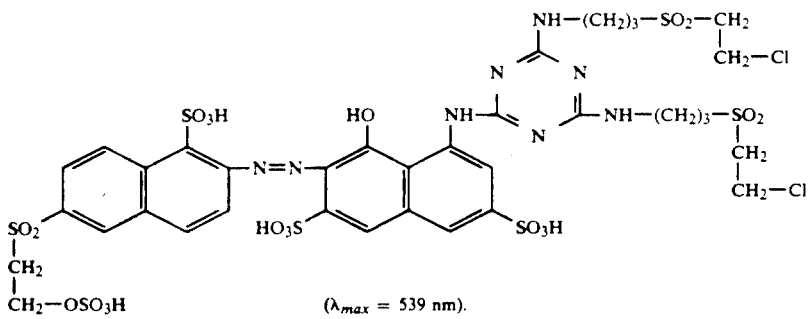

($\lambda_{max}$ = 539 nm).

EXAMPLE 2

The aqueous dye solution obtained according to Example 1 is stirred at 0° to 5° C. and at a pH of 10.5 to 11.5 for about 4 hours and then clarified in a conventional manner. The synthesized vinyl sulfone dye of the formula according to the invention is isolated in the form of an alkali metal salt (the sodium salt) by spray drying at a pH between 5.5 and 7. It likewise dyes fiber materials, such as cotton, in fast red shades. Written in the form of the free acid the dye has the formula:

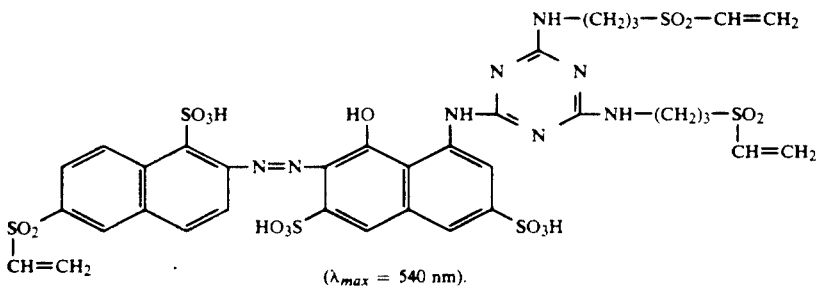

($\lambda_{max}$ = 540 nm).

EXAMPLE 3

155.2 parts of cyanuric chloride are added with stirring to a suspension of 255.2 parts of 1-amino-3,6-disulfo-8-naphthol in 1,440 parts of water and 720 parts of ice while the pH is maintained at 1.7 to 2.2; the batch is subsequently stirred at 0° to 3° C. and the stated pH for about 4 hours, then 204 parts of γ-(β'-hydroxyethylsulfonyl)propylamine hydrochloride are added and the second condensation reaction is carried out at a pH of 7 and a temperature of 60° C. The third condensation reaction is carried out after the addition of a further 204 parts of this propylamine hydrochloride at a pH of 9 and a temperature of 80° to 90° C. The batch then has added to it at 15° to 30° C. the aqueous, hydrochloric acid suspension of the diazonium salt of 411 parts of 1-sulfo-2-amino-6-(β-sulfatoethylsulfonyl)naphthalene, and the coupling reaction takes place within that temperature range and at a pH of 7. The synthesis solution is then clarified and spray-dried. The electrolyte-containing product is added over an hour at not more than 10° C. to a mixture of 800 parts by volume of sulfuric acid monohydrate and 424 parts by volume of 20% strength oleum. After about 2 hours the esterification ends at 10° C. The batch is discharged onto ice, and excess sulfuric acid is neutralized by means of calcium carbonate. The calcium sulfate is filtered off with suction and washed with water. The dye is isolated from the combined filtrates as an alkali metal salt by evaporating under reduced pressure at 60° C. or by spray drying. Written in the form of the free acid it has the formula:

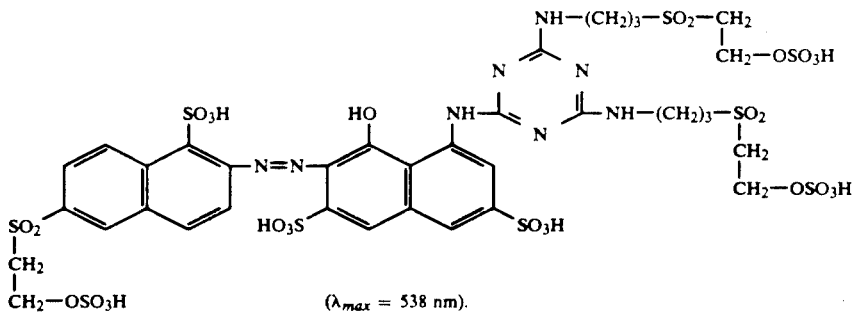

($\lambda_{max}$ = 538 nm).

The dye according to the invention dyes in particular cotton by the application and fixing methods customary for fiber-reactive dyes in deep, fast bluish red shades.

EXAMPLE 4

155.2 parts of cyanuric chloride are added with thorough stirring to a suspension of 255.2 parts of 1-amino-8-naphthol-4,6-disulfonic acid in 1,400 parts of water and 720 parts of ice. The batch is stirred at 0° to 3° C.

and a pH of 1.7 to 2.2 for 4 hours. The synthesis of this primary condensation product completed, the sulfuric acid diazonium salt solution of the diazonium salt of 224.8 parts of 4-(β-sulfatoethylsulfonyl)aniline in 750 parts of water is added, and the coupling reaction is carried out at a pH of 4.0 to 4.5 and a temperature of above 5° C., which is gradually raised to 15°-20° C. Stirring is then continued for some time, and the batch is added to it with 366.5 parts of γ-(β'-chloroethylsulfonyl)propylamine hydrochloride. The reaction is carried out at 0° to 3° C. and a pH of 7 for an hour and then at a pH between 10.5 and 11.5 for 4 hours, in the course of which the β-chloroethylsulfonyl group changes into a vinylsulfonyl group. After the synthesis solution has been clarified, the resulting novel dye of the formula (written in the form of the free acid)

temperature of initially 5° C. and later 15° to 20° C. and at a pH of 4.0 to 4.5. After stirring for several hours the synthesis batch has added to it 480 parts of β-[β'-(β''-chloroethylsulfonyl)ethoxy]ethylamine hydrochloride, and the reaction is carried out at 0° to 3° C. and a pH of 7. After a reaction time of 1 hour the pH is raised to 10.5-12, and the third condensation reaction is completed over 4 hours, in the course of which the β-sulfatoethylsulfonyl group is converted into a vinylsulfonyl group.

The novel compound of the formula

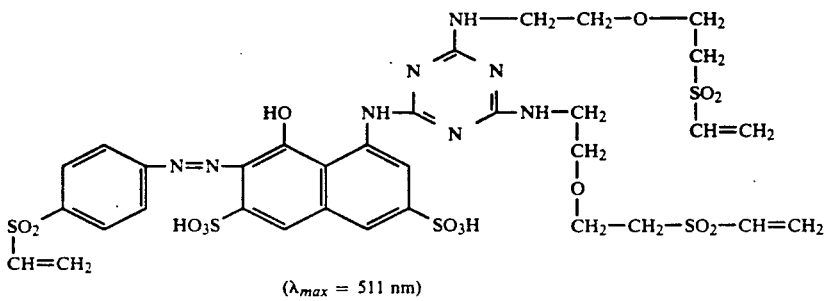

($\lambda_{max}$ = 511 nm)

is isolated in the form of an alkali metal salt in a conventional manner, for example by spray drying. It has very good fiber-reactive dye properties and dyes for example cotton in red shades.

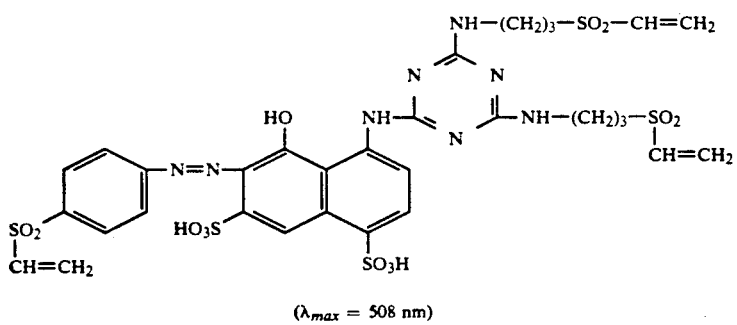

($\lambda_{max}$ = 508 nm)

is isolated by spray drying. It has very good fiber-reactive dye properties and dyes for example cotton in fast yellowish red shades.

EXAMPLE 5

155.2 parts of cyanuric chloride are added to a suspension of 255.2 parts of 1-amino-8-naphthol-3,6-disulfonic acid in 1,440 parts of water and 720 parts of ice with stirring, and the reaction is carried out at a pH of 1.7 to 2.2. After about 4 hours the sulfuric acid aqueous solution of the diazonium salt of 224.8 parts of 4-(β-sulfatoethylsulfonyl)aniline in about 750 parts of water is added, and the coupling reaction is carried out at a

EXAMPLE 6

A dichlorotriazinylamino monoazo compound prepared as described in Example 4 by reacting 1-amino-8-naphthol-4,6-disulfonic acid with cyanuric chloride and subsequent coupling with a diazonium salt of 4-(β-sulfatoethylsulfonyl)aniline is reacted with twice the equivalent amount of N-[γ-(vinylsulfonyl)propyl]piperazine hydrochloride at 0° to 5° C. initially for one hour at a pH of 7 and then for 4 hours at a pH of 10.5 to 12, in the course of which the β-sulfatoethylsulfonyl group is converted into a vinylsulfonyl group. Isolation gives the novel compound of the formula (written in the form of the free acid)

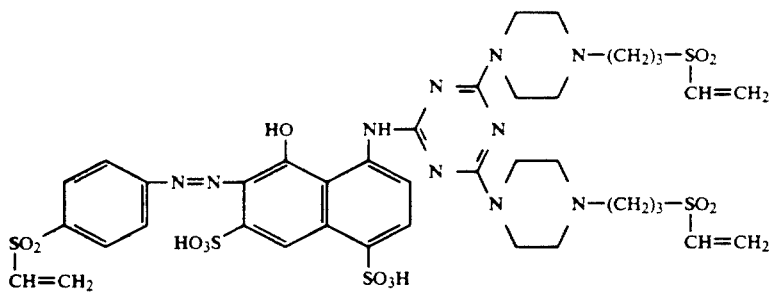

($\lambda_{max}$ = 506 nm)

which has very good fiber-reactive dye properties and dyes for example cotton fast red shades.

EXAMPLE 7

A dichlorotriazinylamino monoazo compound prepared as per Example 5 in the manner of the preceding Working Examples is reacted at 0° to 5° C. with twice the equivalent amount of N-[β-(β'-chloroethylsulfonyl)ethyl]piperazine hydrochloride first at a pH of 7 for one hour and then at a Ph between 11 and 12 for 4 hours, in the course of which the β-chloroethylsulfonyl group is converted into a vinylsulfonyl group. The novel fiber-reactive dye of the formula parts of water is admixed at 0° C. with 47 parts of γ-(β'-chloroethylsulfonyl)propylamine hydrochloride. The condensation reactions are carried out at this temperature first at a pH of 6.5 to 7 for one hour and then at a pH between 10.5 and 12 for 5 hours. The resulting monoazo compound according to the invention is isolated by salting out with sodium chloride or by spray drying. Written in the form of the free acid it has the formula

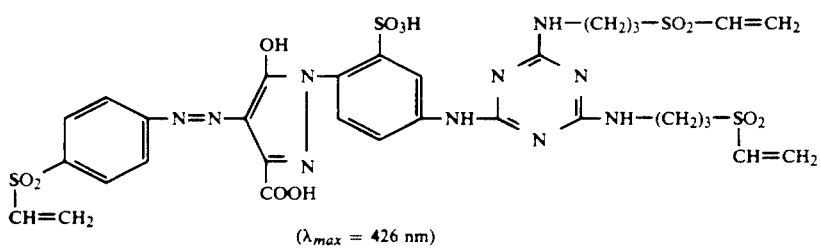

($\lambda_{max}$ = 426 nm)

and dyes for example cotton in strong yellow shades.

EXAMPLE 9

57.3 parts of the monoazo compound 4-(1'-sulfo-6'-β-

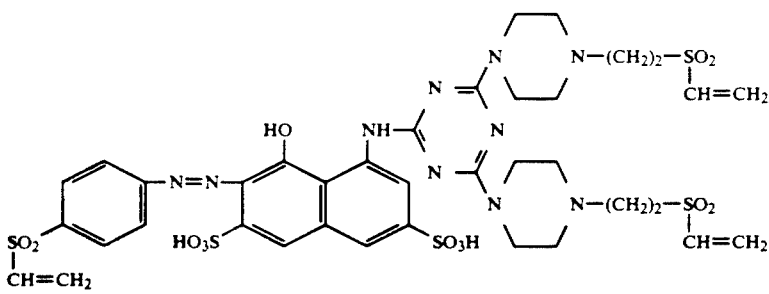

($\lambda_{max}$ = 511 nm)

is isolated in the form of an alkali metal salt in a conventional manner, for example by spray drying. It has very good dye properties and dyes for example cotton in red shades.

EXAMPLE 8

A dichlorotriazinyl(aminophenylpyrazolone)-monoazo compound is synthesized in a conventional manner from cyanuric chloride, 4-(β-sulfatoethylsulfonyl)aniline as diazo component and 1-(2'-sulfo-4'-aminophenyl)-3-carboxy-5-pyrazolone. A pH of 6.8 to 7.2 solution of 72.5 parts of this azo compound in 400 sulfatoethylsulfonylnaphth-2-ylazo)-3-acetylaminoaniline are reacted in a conventional manner in aqueous solution at a pH of 6.8 to 7.2 and a temperature of 0° C. with 14.2 parts of cyanuric fluoride. After the acylation reaction has ended, 47 parts of γ-(β'-chloroethylsulfonyl)propylamine hydrochloride are added, and the condensation reactions are carried out first at 0° to 5° C. and a pH of 7 for an hour and then at 50° to 55° C. and a pH of 6.5 for 5 hours. The resulting dye according to the invention is isolated in the form of an alkali metal salt. Written in the form of the free acid it has the formula

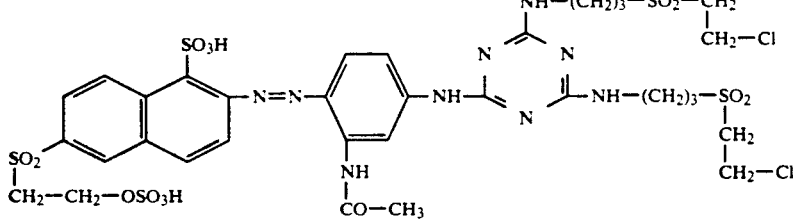

($\lambda_{max}$ = 395 nm)

and dyes for example cotton in strong, fast reddish yellow shades.

EXAMPLE 10

14.2 parts of cyanuric fluoride are gradually added at 0° C. and a pH of 7 to a neutral aqueous solution of 56.2 parts of the monoazo compound 2-(4'-methoxy-3'-β-sulfatoethylsulfonylphenylazo)-3-sulfo-6-amino-1-naphthol. After the acylation reaction has ended, 43 parts of γ-(β-sulfatoethylsulfonyl)propylamine are added, and the condensation reactions are carried out at 0° to 5° C. and a pH of 7 for one hour and then at 50° to 55° C. and a pH of 6.5 for 5 hours. The novel dye of the formula

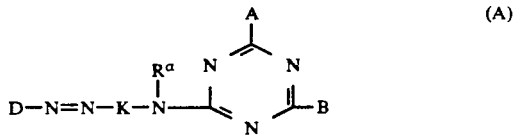 (A)

with reference to their components (the diazo component D—NH$_2$, the coupling component H—K—NR$^a$H, shown attached to triazinyl, and the amino radicals A and B). They can be prepared in a manner according to the invention, for example according to one of the

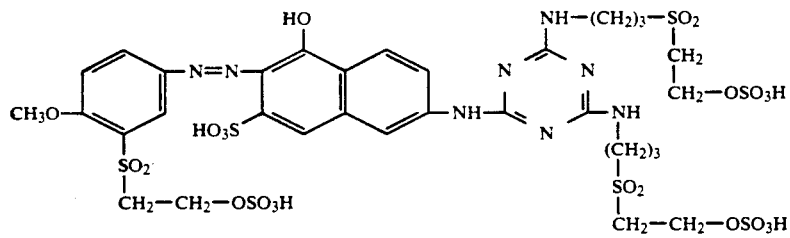

($\lambda_{max}$ = 494 nm)

can be isolated in the form of an alkali metal salt by salting out or spray drying. It dyes for example cotton by the application and fixing methods for fiber-reactive dyes in brilliant scarlet shades.

EXAMPLES 11 to 59

The Table Examples below describe further novel dyes conforming to the general formula (A)

above Working Examples, for example by reacting the corresponding dihalotriazinylamino starting azo compound with the corresponding amino compound conforming to the general formula (16) with or without simultaneous conversion of the radical Y$^1$ or Y$^2$ into vinylsulfonyl. They have very good fiber-reactive dye properties and dye for example cotton in high color strength and good fastness properties in the hues indicated in the particular Table Example.

| | | Dye of the formula (A) | | |
|---|---|---|---|---|
| Ex. | Radical D— | Component H—K—NHR$^a$ | Radicals A and B | Hue |
| 11 | 2-sulfo-4-(β-sulfatoethylsulfonyl)phenyl | 1-amino-3,6-disulfo-8-naphthol | γ-(β'-chloroethylsulfonyl)propylamine | yellowish red |
| 12 | 2-sulfo-4-vinylsulfonylphenyl | 1-amino-3,6-disulfo-8-naphthol | γ-(vinylsulfonyl)propylamino | yellowish red |
| 13 | 2-carboxy-5-(β-sulfatoethylsulfonyl)phenyl | 1-amino-3,6-disulfo-8-naphthol | γ-(β'-sulfatoethylsulfonyl)propylamino | yellowish red |
| 14 | 3-(β-sulfatoethylsulfonyl)phenyl | 1-amino-3,6-disulfo-8-naphthol | γ-(β'-sulfatoethylsulfonyl)propylamino | red |
| 15 | 3-vinylsulfonylphenyl | 1-amino-3,6-disulfo-8-naphthol | γ-(vinylsulfonyl)propylamino | red |
| 16 | 2-methoxy-5-(β-sulfatoethylsulfonyl)phenyl | 1-amino-3,6-disulfo-8-naphthol | γ-(β-chloroethylsulfonyl)propylamino | bluish red |
| 17 | 2,5-dimethoxy-4-(β-sulfatoethylsulfonyl)phenyl | 1-amino-3,6-disulfo-8-naphthol | γ-(β'-sulfaethylsulfonyl)propylamino | bluish red |
| 18 | 4-[N-(3'-β-sulfatoethylsulfonyl)phenyl]carbamoylphenyl | 1-amino-3,6-disulfo-8-naphthol | γ-(β'-sulfaethylsulfonyl)propylamino | red |
| 19 | 2-sulfo-5-[γ-(vinylsulfonyl)butyrylamino]phenyl | 1-amino-3,6-disulfo-8-naphthol | γ-(vinylsulfonyl)propylamino | yellowish red |
| 20 | 4-sulfo-5-[γ-(vinylsulfo- | 1-amino-3,6-disulfo-8- | γ-(vinylsulfonyl)propyl- | bluish red |

-continued

| | Dye of the formula (A) | | | |
|---|---|---|---|---|
| Ex. | Radical D— | Component H—K—NHR$^a$ | Radicals A and B | Hue |
| | nyl)butyrylamino]phenyl | naphthol | amino | |
| 21 | 4-methoxy-3-(β-sulfato-ethylsulfonyl)phenyl | 1-amino-3,6-disulfo-8-naphthol | γ-(β'-chloroethylsulfonyl)propylamino | bluish red |
| 22 | 2-hydroxy-5-(β-sulfato-ethylsulfonyl)phenyl | Copper complex with: 1-amino-3,6-disulfo-8-naphthol | γ-(β'-sulfatoethylsulfonyl)propylamino | violet |
| 23 | 2-hydroxy-5-methoxy-4-β-sulfatoethylsulfonyl-phenyl | Copper complex with: 1-amino-3,6-disulfo-8-naphthol | γ-(β'-sulfatoethylsulfonyl)propylamino | blue |
| 24 | 2-hydroxy-6-sulfo-8-(β-sulfatoethylsulfonyl)-naphth-2-yl | Copper complex with: 1-amino-3,6-disulfo-8-naphthol | γ-(β'-chloroethylsulfonyl)propylamino | blue |
| 25 | 2-hydroxy-5-(β-sulfato-ethylsulfonyl)phenyl | Copper complex with: 3-(1'-amino-3',6'-disulfo-8'-hydroxynaphth-7'-yl)azo-6-sulfo-8-naphthol | γ-(vinylsulfonyl)propylamino | blue |
| 26 | 2-sulfo-6-(β-sulfato-ethylsulfonyl)naphth-2-yl | 1-amino-4,6-disulfo-8-naphthol | γ-(β'-sulfatoethylsulfonyl)propylamino | red |
| 27 | 2-sulfo-vinylsulfonyl-phenyl | 1-(2'-sulfo-4-aminophenyl)-3-carboxy-5-pyrazolone | β-[β'-(vinylsulfonyl)-ethoxy]ethylamino | yellow |
| 28 | 2-sulfo-6-(β-sulfato-ethylsulfonyl)naphth-2-yl | 1-(2'-sulfo-4-aminophenyl)-3-carboxy-5-pyrazolone | γ-(β'-chloroethylsulfonyl)propylamino | yellow |
| 29 | 4-[N-(3'-β-sulfatoethyl-sulfonyl)carbamoyl]phenyl | 1-(2'-sulfo-4-aminophenyl)-3-carboxy-5-pyrazolone | γ-(β'-sulfatoethylsulfonyl)propylamino | yellow |
| 30 | 2-methoxy-5-methyl-4-(β-sulfatoethylsulfonyl)-phenyl | 1-(2'-sulfo-4-aminophenyl(-3-carboxy-5-pyrazolone | γ-(β'-sulfatoethylsulfonyl)propylamino | yellow |
| 31 | 2,5-dimethoxy-4-(β-sulfatoethylsulfonyl)phenyl | 1-(2'-sulfo-4'-aminophenyl)-3-methyl-5-pyrazolone | γ-(β'-sulfatoethylsulfonyl)propylamino | golden yellow |
| 32 | 2,5-dimethoxy-4-(β-sulfatoethylsulfonyl)phenyl | 1-(2'-sulfo-4'-aminophenyl)-3-methyl-5-pyrazolone | γ-(vinylsulfonyl)propylamino | golden yellow |
| 33 | 2-hydroxy-5-(β-sulfato-ethylsulfonyl)phenyl | Copper complex with: 1-(2'-sulfo-4'-aminophenyl)-3-methyl-5-pyrazolone | γ-(vinylsulfonyl)propylamino | yellow brown |
| 34 | 2-hydroxy-5-(β-sulfato-ethylsulfonyl)phenyl | Copper complex with: 1-(2'-sulfo-4'-aminophenyl)-3-methyl-5-pyrazolone | 4-[γ-(vinylsulfonyl)-propyl]piperazin-1-yl | brown |
| 35 | 4-(β-sulfatoethylsulfonyl)phenyl | 1-(2'-sulfo-5'-aminophenyl)-3-carboxy-5-pyrazodone | γ-(vinylsulfonyl)propylamino | yellow |
| 36 | 2-sulfo-6-vinylsulfonyl-naphth-2-yl | 1-(2'-sulfo-5'-aminophenyl)-3-carboxy-5-pyrazodone | γ-(vinylsulfonyl)propylamino | yellow |
| 37 | 4-vinylsulfonylphenyl | 1-(2',4'-disulfo-5'-aminophenyl)-3-methyl-5-pyrazolone | γ-(vinylsulfonyl)propylamino | yellow |
| 38 | 1-sulfo-6-vinylsulfonyl-naphth-2-yl | 1-(2',4'-disulfo-5'-aminophenyl)-3-methyl-5-pyrazolone | γ-(vinylsulfonyl)propylamino | yellow |
| 39 | 2-sulfo-4-(β-sulfato-ethylsulfonyl)phenyl | 3-carbamoyl-4-methyl-1-(β-aminoethyl)-2-hydroxyhydroxypyrid-6-one | γ-(β-sulfatoethylsulfonyl)propylamino | greenish yellow |
| 40 | 2-sulfo-4-(β-sulfato-ethylsulfonyl)phenyl | 4-methyl-1-(γ-aminopropyl)-2-hydroxypyrid-6-one | γ-(β-sulfatoethylsulfonyl)propylamino | greenish yellow |
| 41 | 1-sulfo-6-(β-sulfato-ethylsulfonyl)naphth-2-yl | 3-carbamoyl-4-methyl-1-(γ-aminopropyl)-2-hydroxypyrid-6-one | β-[β'-(β''-chloroethyl-sulfonyl)ethoxy]ethyl-amino | greenish yellow |
| 42 | 6-sulfo-8-(β-sulfato-ethylsulfonyl)naphth-2-yl | 3-carbamoyl-4-methyl-1-(γ-aminopropyl)-2-hydroxypyrid-6-one | γ-(β'-sulfatoethylsulfonyl)propylamino | greenish yellow |
| 43 | 1-sulfo-6-vinylsulfonyl-naphth-2-yl | 3-sulfomethyl-4-methyl-1-(β-aminoethyl)-2-hydroxypyrid-6-one | γ-(vinylsulfonyl)propylamino | greenish yellow |
| 44 | 2-sulfo-5-γ-(vinylsulfonyl)butyrylamidophenyl | 3-carbamoyl-4-methyl-1-(γ-aminopropyl)-2-hydroxypyrid-6-one | γ-(vinylsulfonyl)propylamino | greenish yellow |
| 45 | 2-sulfo-5-γ-(vinylsulfonyl)butyrylamidophenyl | 3-sulfomethyl-4-methyl-1-(γ-aminopropyl)-2- | γ-(vinylsulfonyl)propylamino | greenish yellow |

-continued

| Ex. | Radical D— | Dye of the formula (A) Component H—K—NHR$^a$ | Radicals A and B | Hue |
|---|---|---|---|---|
| 46 | 4-(β-sulfatoethylsulfonyl)phenyl | hydroxypyrid-6-one 1-amino-3,6-disulfo-8-naphthol | γ-(β-thiosulfatoethylsulfonyl)propylamino | red |
| 47 | 1-sulfo-6-vinylsulfonyl-naphth-2-yl | 2-sulfo-5-acetylaminoaniline | γ-(vinylsulfonyl)propylamino | reddish yellow |
| 48 | 1-sulfo-6-(β-sulfatoethylsulfonyl)naphth-2-yl | 3-ureidoaniline | γ-(β'-sulfatoethylsulfonyl)propylamino | reddish yellow |
| 49 | 6-sulfo-8-(β-sulfatoethylsulfonyl)naphth-2-yl | 3-ureidoaniline | γ-(β'-sulfatoethylsulfonyl)propylamino | reddish yellow |
| 50 | 6-sulfo-8-(β-sulfatoethylsulfonyl)naphth-2-yl | 2-sulfo-5-acetylaminoaniline | β-[β'-(β''-chloroethylsulfonyl)ethoxy]ethylamino | reddish yellow |
| 51 | 1-sulfo-6-(β-sulfatoethylsulfonyl)naphth-2-yl | 2-sulfo-5-acetylaminoaniline | γ-(β'-chloroethylsulfonyl)propylamino | reddish yellow |
| 52 | 4-(β-sulfatoethylsulfonyl)phenyl | 1-amino-3,6-disulfo-8-naphthol | A: γ-(β'-chloroethylsulfonyl)propylamino B: 4-[γ-(β'-chloroethylsulfonyl)propyl]-piperazin-1-yl | red |
| 53 | 2-methoxy-5-(β-sulfatoethylsulfonyl)phenyl | 3-amino-6-sulfo-8-naphthol | γ-(β'-sulfatoethylsulfonyl)propylamino | scarlet |
| 54 | 2-methoxy-5-(β-sulfatoethylsulfonyl)phenyl | 3-methylamino-6-sulfo-8-naphthol | γ-(β'-sulfatoethylsulfonyl)propylamino | scarlet |
| 55 | 1-sulfo-6-(β-sulfatoethylsulfonyl)naphth-2-yl | 3-amino-6-sulfo-8-naphthol | γ-(β'-sulfatoethylsulfonyl)propylamino | orange |
| 56 | 6-sulfo-8-(β-sulfatoethylsulfonyl)naphth-2-yl | 3-amino-6-sulfo-8-naphthol | γ(β'-sulfatoethylsulfonyl)propylamino | orange |
| 57 | 1-sulfo-6-vinylsulfonyl-naphth-2-yl | 3-methylamino-6-sulfo-8-naphthol | γ-(β'-vinylsulfonyl)-propylamino | orange |
| 58 | 6-sulfo-8-vinylsulfonyl-naphth-2-yl | 3-methylamino-6-sulfo-8-naphthol | 4-(β-vinylsulfonylethyl-piperazin-1-yl | orange |
| 59 | 4-methoxy-3-(β-sulfatoethylsulfonyl)phenyl | 3-methylamino-6-sulfo-8-naphthol | γ-(β'-sulfatoethylsulfonyl)propylamino | scarlet |

EXAMPLE 60

56.2 parts of the monoazo compound 4-(5'-amino-2'-sulfophenylazo)-1-((4''-β-sulfatoethylsulfonyl-phenyl)-3-methyl-5-pyrazolone are reacted in aqueous solution at 0° to 3° C. and a pH between 1.7 and 2.2 with 15.5 parts of cyanuric chloride. 40.8 parts of γ-(β'-hydroxyethylsulfonyl)propylamine hydrochloride are then added, and the first condensation reaction is carried out at pH 7 and 60° C. and the second condensation reaction at pH 9 and 80°-90° C. The resulting β-hydroxyethylsulfonyl-containing azo compound is salted out with potassium chloride, isolated and dried. It is added over an hour at a temperature of not more than 10° C. to a mixture of 80 parts by volume of sulfuric acid monohydrate and 42.4 parts of 20% strength oleum. The batch is subsequently stirred at 10° C. for about 2 hours and then added to ice, the mixture is neutralized with calcium carbonate, filtered with suction, and the calcium sulfate is washed with water. The combined filtrates are evaporated under reduced pressure. This gives the novel compound of the formula

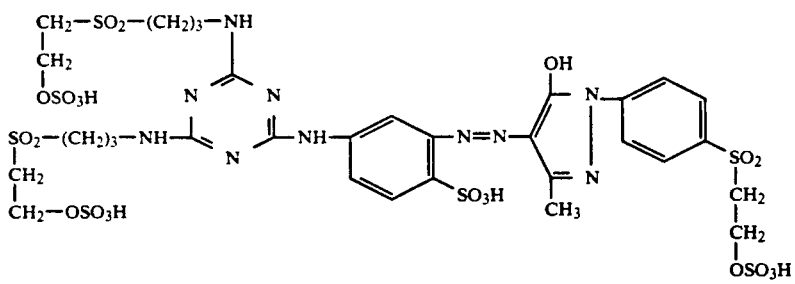

(λ$_{max}$ = 406 nm)

in the form of an alkali metal salt. It has very good fiber-reactive dye properties and dyes for example cotton in deep yellow shades.

EXAMPLES 61 TO 77

The Table Examples below describe further novel azo compounds conforming to the general formula (B)

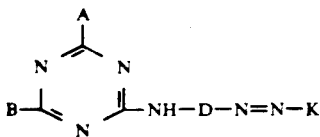

(B)

with reference to the discernible components. They can be prepared in a manner according to the invention, for example as described in Working Example 60, by reaction of the starting compound cyanuric chloride or cyanuric fluoride, the amino compound conforming to the general formula (16), the amino-containing aniline or naphthylamine diazo component conforming to the general formula $H_2N—D—NH_2$ and the corresponding coupling component H—K. They have very good fiber-reactive dye properties and produce on the fiber materials mentioned in the description, in particular on cotton, by the application and fixing methods customary for fiber-reactive dyes strong dyeings and prints having the hue indicated in the particular Table Example for cotton.

| | | Azo dye of the formula (B) | | |
|---|---|---|---|---|
| Ex. | Radical —D—N=N— | Radical —K | Radicals A and B | Hue |
| 61 | 2,4-disulfo-5-azophenyl | 1-(4'-vinylsulfonyl-phenyl)-3-methylpyrazol-5-on-4-yl | γ-(vinylsulfonyl)propyl-amino | yellow |
| 62 | 1-sulfo-2-azonaphth-5-methylenyl | 1-(4'-β-sulfatoethyl-sulfonyl)-3-methyl-pyrazol-5-on-4-yl | γ-(β'-sulfatoethylsulfo-nyl)propylamino | yellow |
| 63 | 4-sulfo-3-azophenyl | 2-[N-methyl-N-(β-sul-fatoethylsulfonyl)]-amino-6-sulfo-8-hydroxy-naphth-7-yl | γ-(β'-sulfatoethylsulfo-nyl)propylamino | orange |
| 64 | 2,4-disulfo-5-azophenyl | 2-[N-methyl-N-(β-sul-fatoethylsulfonyl)]-amino-6-sulfo-8-hydroxy-naphth-7-yl | γ-(vinylsulfonyl)propyl-amino | orange |
| 65 | 4-sulfo-3-azophenyl | 3-[3'-β-chloroethylsul-fonyl)benzoylamino]-6-sulfo-8-hydroxynaphth-7-yl | γ(β'-sulfatoethylsulfo-nyl)propylamino | orange |
| 66 | 1-sulfo-2-azonaphth-5-methylenyl | 3-[3'-β-chloroethylsul-fonyl)benzoylamino]-6-sulfo-8-hydroxynaphth-7-yl | γ-(β'-chloroethylsulfo-nyl)propylamino | orange |
| 67 | 4-sulfo-3-azophenyl | 3-[N'-(3'-β-chloroethyl-sulfonylphenyl)]-ureido-6-sulfo-8-hydroxynaphth-7-yl | γ-(β'-sulfatoethylsulfo-nyl)propylamine | orange |
| 68 | 1-sulfo-2-azonaphth-5-methylen-yl | 3-[N'-(3'-β-chloroethyl-sulfonylphenyl)]-ureido-6-sulfo-8-hydroxynaphth-7-yl | γ-(β'-sulfatoethylsulfo-nyl)propylamine | orange |
| 69 | 1-sulfo-2-azonaphth-5-methylen-yl | 3-[N'-(4'-β-sulfato-ethylsulfonylphenyl)]-ureido-6-sulfo-8-hydroxynaphth-7-yl | γ-(β'-sulfatoethylsulfo-nyl)propylamine | orange |
| 70 | 2,4-disulfo-5-azophenyl | 3-[N'-(3'-vinylsulfo-nylphenyl)]ureido-6-sulfo-8-hydroxynaphth-7-yl | γ-(vinylsulfonyl)propyl-amino | orange |
| 71 | 4-sulfo-3-azophenyl | 1-(3'-vinylsulfonyl-benzoylamino)-3,6-di-sulfo-8-hydroxynaphth-7-yl | γ-(vinylsulfonyl)propyl-amino | yellowish red |
| 72 | 4-sulfo-3-azophenyl | 1-(4'-vinylsulfonyl-benzoylamino)-3,6-di-sulfo-8-hydroxynaphth-7-yl | γ-(vinylsulfonyl)propyl-amino | yellowish red |
| 73 | 4-sulfo-3-azophenyl | 1-(3'-vinylsulfonyl-benzoylamino)-4,6-di-sulfo-8-hydroxynaphth-7-yl | γ-(vinylsulfonyl)propyl-amino | yellowish red |
| 74 | 3-sulfo-4-azophenyl | 1-(3'-β-chloroethylsul-fonyl-benzoylamino)-3,6-disulfo-8-hydroxy-naphth-7-yl | γ(β'-chloroethylsulfo-nyl)propylamino | bluish red |
| 75 | 1-sulfo-2-azonaphth-5 methylenyl | 1-(3'-β-chloroethylsul-fonyl-benzoylamino)-3,6-disulfo-8-hydroxy-naphth-7-yl | γ-(β'-sulfatoethylsulfo-nyl)proplyamino | bluish red |
| 76 | 1-sulfo-2-azonaphth-5 methylenyl | 1-(3'-vinylsulfonyl-benzoylamino)-3,6-disulfo-8-hydroxy-naphth-7-yl | γ-(vinylsulfonyl)propyl-amino | bluish red |
| 77 | 3-sulfo-4-azophenyl | 1-(4'-β-sulfatoethyl-sulfonylphenyl)-3-methylpyrazol-5-on- | γ-(β'-sulfatoethylsulfo-nyl)propylamino | yellow |

-continued

| | Azo dye of the formula (B) | | | |
|---|---|---|---|---|
| Ex. | Radical —D—N=N— | Radical —K | Radicals A and B | Hue |
| | 4-yl | | | |

EXAMPLE 78

81.1 parts of the disazo compound 1-amino-2-(4'-β-sulfatoethylsulfonylphenylazo)-7-(2''-sulfo-5''-aminophenylazo)-8-naphthol-3,6-disulfonic acid are reacted in

EXAMPLES 79 TO 86

The Table Examples below describe further novel disazo dyes conforming to the general formulae (C) and (D)

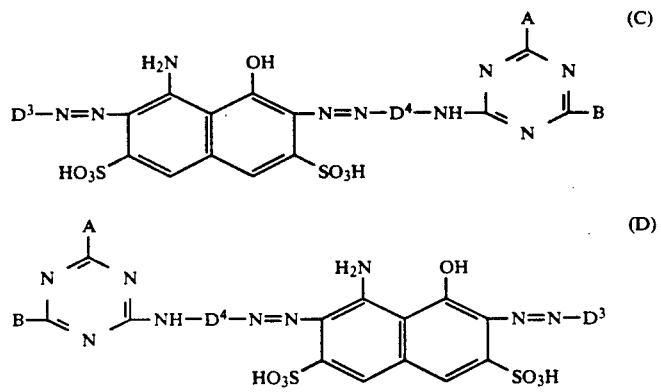

aqueous solution at a pH of 7 and a temperature of 0° to 3° C. with 14.2 parts of cyanuric fluoride. 47 parts of γ-(β'-chloroethylsulfonyl)propylamine hydrochloride are then added, and the condensation reactions are first carried out at 0° to 5° C. and a pH of 7 for one hour and then at 50° to 55° C. and a pH of 6.5 for 5 hours. The synthesized novel azo dye of the formula in terms of the discernible components. They can be prepared in a manner according to the invention, for example as described in Working Example 78, by reaction of the amino-containing disazo dye with a cyanuric halide, such as cyanuric fluoride or cyanuric chloride, and the amino compound conforming to the general formula (16).

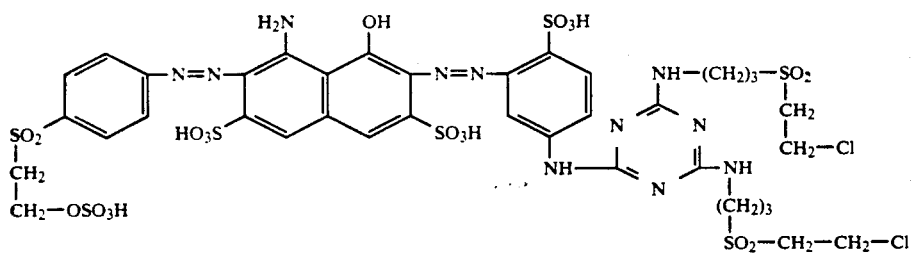

($\lambda_{max}$ = 604 nm)

is isolated in the form of an alkali metal salt by salting out with an electrolyte salt, such as sodium chloride or potassium chloride, or by spray drying. It has very good fiber-reactive dye properties and dyes for example cotton by the customary application and fixing methods in deep, fast navy shades.

They have very good fiber-reactive dye properties and produce on the fiber materials mentioned in the description, in particular on cotton, by the application and fixing methods customary for fiber-reactive dyeings strong dyes and prints having the hue on cotton indicated in the particular Table Example.

| | | Dye of the formulae (C) and (D) | | | |
|---|---|---|---|---|---|
| Ex. | Formula | Radical $D^3$— | Radical $D^4$— | Radicals A and B | Hue |
| 79 | (C) | 4-vinylsulfonylphenyl | ![HO3S-phenyl] | β-[β'-(vinylsulfonyl)ethylamino]ethylamino | navy |
| 80 | (C) | 2-bromo-4-vinylsulfonylphenyl | '' | γ-(vinylsulfonyl)propylamino | '' |

-continued

| Ex. | Formula | Radical D³— | Radical D⁴— | Radicals A and B | Hue |
|---|---|---|---|---|---|
| 81 | (D) | 2-bromo-4-vinylsulfonylphenyl | ![benzene-SO₃H] | γ-(vinylsulfonyl)propylamino | " |
| 82 | (D) | 2-sulfo-5-[3'-(β-chloroethylsulfonyl)-benzoylamino]phenyl | " | γ-(β'-sulfatoethylsulfonyl)propylamino | " |
| 83 | (C) | 2-sulfo-5-[3'-(β-chloroethylsulfonyl)-benzoylamino]phenyl | HO₃S—[benzene] | γ-(vinylsulfonyl)propylamino | " |
| 84 | (D) | 2-sulfo-5-[γ-(β'-chloroethylsulfonyl)-butyrylamino]phenyl | [benzene]—SO₃H | γ-(β'-chloroethylsulfonyl)propylamino | " |
| 85 | (C) | 2-sulfo-5-[γ-(β'-chloroethylsulfonyl)-butyrylamino]phenyl | HO₃S—[benzene] | γ-(β'-chloroethylsulfonyl)propylamino | " |
| 86 | (D) | 4-vinylsulfonylphenyl | [benzene]—SO₃H | γ-(vinylsulfonyl)propylamino | " |

EXAMPLES 87 TO 93

The Table Examples below describe further novel disazo dyes conforming to the general formula (E)

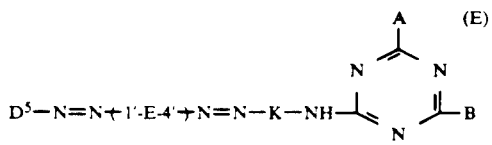

$$D^5-N=N+1'-E-4'+N=N-K-NH-\underset{N}{\overset{A}{\underset{\parallel}{\bigtriangleup}}}B \quad (E)$$

in terms of the discernible components. They can be prepared in a manner according to the invention, for example as described in Working Example 78, by reaction of the amino-containing disazo dye with a cyanuric halide, such as cyanuric fluoride or cyanuric chloride, and the amino compound conforming to the general formula (16).

They have very good fiber-reactive dye properties and produce on the fiber materials mentioned, in particular on cotton, by the application and fixing methods customary for fiber-reactive dyes strong dyeings and prints having the hue on cotton indicated in the particular Table Example.

| Ex. | Radical D⁵— | Radical —E— | Radical —N=N—K—NH— | Radicals A and B | Hue |
|---|---|---|---|---|---|
| 87 | 6-sulfo-8-(β-sulfatoethyl-sulfonyl)-naphth-2-yl | 2'-methyl-5'-methoxyphen-1',4'-ylene | 7-azo-8-hydroxy-3,6-disulfonaphth-1-yl-amino | γ-(β'-chloroethyl-sulfonyl)propyl-amino | blue |
| 88 | 1-sulfo-6-(β-sulfatoethyl-sulfonyl)-naphth-2-yl | 2'-methylphen-1',4'-ylene | 7-azo-8-hydroxy-3,6-disulfonaphth-1-yl-amino | γ-(vinylsulfonyl)-propylamino | blue |
| 89 | 4-methoxy-3-(β-sulfatoethyl-sulfonyl)phenyl | (6',7')-mono-sulfonaphth-1',4'-ylene | 1-azo-(6,7)-mono-sulfonaphth-4-ylamino | γ-(β'-chloroethyl-sulfonyl)propylamino | brown |
| 90 | 2-methoxy-5-(β-sulfato-ethylsulfonyl)-phenyl | (6',7')-mono-sulfonaphth-1',4'-ylene | 1-azo-(6,7)-mono-sulfonaphth-4-ylamino | γ-(β'-sulfatoethyl-sulfonyl)propyl-amino | brown |
| 91 | 1-sulfo-6-(β-sulfatoethyl-sulfonyl)-naphth-2-yl | (6',7')-mono-sulfonaphth-1',4'-ylene | 1-azo-2-methylphen-4-ylamino | γ-(β'-sulfatoethyl-sulfonyl)propyl-amino | brown |
| 92 | 6-sulfo-8-(β-sulfatoethyl-sulfonyl)-naphth-2-yl | (6',7')-mono-sulfonaphth-1',4'-ylene | 1-azo-2-methylphen-4-ylamino | γ-(β'-sulfatoethyl-sulfonyl)propyl-amino | brown |
| 93 | 1-sulfo-6-(β- | 2'-methyl-5'- | 7-azo-8-hydroxy-3,6- | γ-(β'-sulfatoethyl- | blue |

-continued

| Ex. | Radical D⁵— | Radical —E— | Dye of the formula (E) Radical —N=N—K—NH— | Radicals A and B | Hue |
|---|---|---|---|---|---|
| | sulfatoethyl-sulfonyl)-naphth-2-yl | methoxyphen-1',4'-ylene | disulfonaphth-1-yl-amino | sulfonyl)propyl-amino | |

We claim:
1. A dye conforming to the general formula (5b) or (5c)

$$(Y-SO_2-X^1)_n-D^1-N=N-E^1-N=N)_vK^*-Z \quad (5b)$$

$$Z-D^*-N=N-E^1-N=N)_vK^1-X^2-SO_2-Y \quad (5c)$$

where
n is 1 or 2,
Y is vinyl, β-sulfatoethyl, β-haloethyl, β-thiosulfatoethyl, β-phosphatoethyl or β-acetoxyethyl,
$X^1$ is a direct bond, alkylene of 1 to 4 carbon atoms or the bivalent radical of an alkanoylamido group of 2 to 5 carbon atoms,
$D^1$ is a phenylene substituted by substituents $R^2$ and $R^3$ which have the following meanings:
  $R^2$ is hydrogen, methyl, ethyl, methoxy, ethoxy, alkanoyl of 2 to 5 carbon atoms, cyano, carboxy, sulfo, alkoxycarbonyl of 2 to 5 carbon atoms, carbamoyl, N-(C₁-C₄)carbamoyl, fluorine, chlorine, bromine or trifluoromethyl,
  $R^3$ is hydrogen, methyl, ethyl, methoxy, ethoxy, cyano, carboxy, sulfo, alkanoylamino of 2 to 5 carbon atoms, alkoxycarbonyl of 2 to 5 carbon atoms, carbamoyl, N-(C₁-C₄)-carbamoyl, fluorine, chlorine, nitro, sulfamoyl, N-(C₁-C₄-alkyl)-sulfamoyl, alkylsulfonyl of 1 to 4 carbon atoms, phenylsulfonyl or phenoxy,
$E^1$ is a radical of the general formula (7a), (7b), (7c), or (7d)

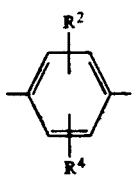  (7a)

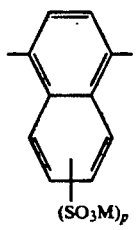  (7b)

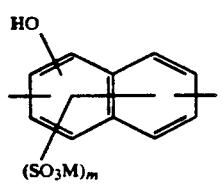  (7c)

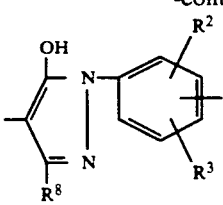  (7d)

where
$R^2$ and $R^3$ are each as defined above,
$R^4$ is hydrogen, alkyl of 1 to 4 carbon atoms, alkoxy of 1 to 4 carbon atoms, chlorine, alkanoylamino of 2 to 5 carbon atoms, benzoylamino, ureido, N'-phenylureido, N'-alkylureido of 1 to 4 carbon atoms in the alkyl moiety, phenylsulfonyl or alkylsulfonyl of 1 to 4 carbon atoms,
M is hydrogen or an alkali metal,
m is 1 or 2,
p is zero, 1 or 2,
$R^8$ is hydrogen, alkyl of 1 to 4 carbon atoms, cyano, carboxy, carbalkoxy of 2 to 5 carbon atoms, carbamoyl or phenyl,
v is zero or 1,
—K*—Z of formula (5b), is a radical of the general formula (8a), (8e) or (8f)

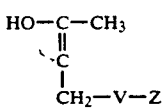  (8a)

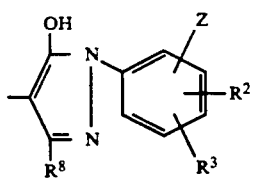  (8e)

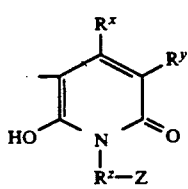  (8f)

where
$R^2$, $R^3$, p and M are each as defined above,
V is a phenylene substituted by $R^2$ and $R^3$ defined above or is a naphthylene unsubstituted or substituted by 1 or 2 sulfo groups,
Z is a radical of the general formula (4)

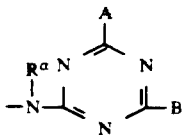

where 2 substituents from the group consisting of sulfo, carboxy, methyl, ethyl, methoxy, ethoxy and chlorine, or a group of the general formula —SO$_2$—Y$^2$ where Y$^2$ has one of the meanings specified above for Y or is β-hydroxyethyl, Y$^2$ being identical to or different from Y, k is zero, 1 or 2, k* is zero, 1, 2, 3 or 4, X is together with the N-atom the bivalent radical of a heterocyclic containing 1 or 2 alkylene groups of 1 to 5 carbon atoms with or without 1 or 2 hetero atoms selected from nitrogen and oxygen, Y$^1$ has one of the meanings specified above for Y, Y$^1$ being identical to or different from Y, and W is hydrogen, methyl, sulfomethyl, carboxymethyl, straight-chain or branched alkyl of 2 to 6 carbon atoms unsubstituted or substituted by 1 or 2 substituents from the group consisting of methoxy, ethoxy, carboxy, sulfo, hydroxy and halogen, unsubstituted or methyl-substituted cycloalkylene of 5 to 8 carbon atoms, or phenyl unsubstituted or R$^a$ is hydrogen or straight-chain or branched alkyl of 1 to 4 carbon atoms unsubstituted or substituted by carboxy, sulfo, cyano, hydroxy or chlorine, A is a group of the general formula (2a) or (2b)

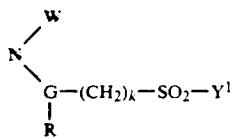

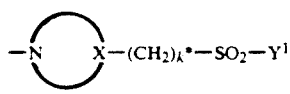

where

G is a straight-chain or branched alkylene of 1 to 6 carbon atoms, or is an alkylene of 2 to 6 carbon atoms which is interrupted by 1 or 2 groups selected from oxygen and —NH—, the alkylene moieties being straight-chain or branched, or is cycloalkylene of 5 to 8 carbon atoms, unsubstituted or substituted by methyl, R is hydrogen, chlorine, bromine, fluorine, hydroxy, sulfato, cyano, carboxy, carbamoyl, carbalkoxy of 2 to 5 carbon atoms, alkanoyloxy of 2 to 5 carbon atoms, benzoylamino unsubstituted or substituted by 1 to substituted by substituents from the group consisting of alkyl of 1 to 4 carbon atoms, alkoxy of 1 to 4 carbon atoms, carboxy, sulfo and halogen, and B has one of the meanings specified for A, A and B having meanings identical to or different from each other, R$^8$ as defined above, R$^x$ is hydrogen, alkyl of 1 to 4 carbon atoms, or alkyl of 1 to 4 carbon atoms substituted by alkoxy of 1 to 4 carbon atoms or by cyano, R$^y$ is hydrogen, sulfo, sulfoalkyl having an alkylene moiety of 1 to 4 carbon atoms, cyano or carbamoyl, R$^z$ is alkylene of 1 to 6 carbon atoms, phenylene unsubstituted or substituted by substituents from the group consisting of methyl, ethyl, chlorine, carboxy and sulfo, or alkylenephenylene having 2 to 4 carbon atoms in the alkylene moiety, D* is a phenylene radical unsubstituted or substituted by 1 or 2 substituents from the group consisting of hydrogen, methyl, ethyl, methoxy, bromine, chlorine, carboxy and sulfo, or is a naphthylene radical unsubstituted or substituted by 1 or 2 sulfo groups, K$^1$ is a radical of the general formula (9a), (9b) or (9c),

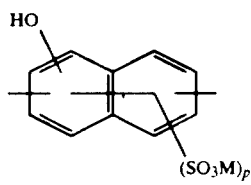

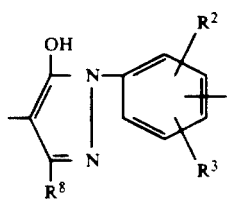

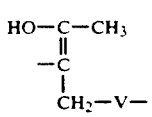

where M, p, V, R$^2$, R$^3$ and R$^8$ are each as defined above and the hydroxy group in the formula (9a) is ortho to the free bond attached to the azo group, X$^2$ is a direct bond, alkylene of 1 to 4 carbon atoms or the bivalent radical of an alkanoylamido group of 2 to 5 carbon atoms.

2. A dye as claimed in claim 1 conforming to the general formula (5b)

$$(Y-SO_2-X^1)_n-D^1-N=N-E^1-N=N)_vK^*-Z \qquad (5b)$$

where Y X$^1$, D$^1$, E$^1$, v, —K*—Z and n are each as defined in claim 1.

3. A dye as claimed in claim 2, wherein X$^1$ is a direct bond.

4. A dye as claimed in claim 1, conforming to the general formula (5c)

$$Z-D^*-N=N-E^1-N=N)_vK^1-X^2-SO_2-Y \qquad (5c)$$

where Z, D*, E$^1$, v, K$^1$, X$^2$ and Y are each as defined in claim 1.

5. A dye as claimed in claim 4, wherein X$^2$ is a direct bond.

6. A dye as claimed in claim 1, wherein R$^a$ is hydrogen.

7. A compound as claimed in claim 1, wherein R$^a$ is methyl.

8. A dye as claimed in claim 1, wherein A is a group of the general formula (2a) having the meaning mentioned in claim 1.

9. A dye as claimed in claim 8, wherein W is hydrogen or methyl, R is hydrogen, k is zero and $Y^1$ is $\beta$-sulfatoethyl or $\beta$-chloroethyl.

10. A dye as claimed in claim 9, wherein G is n-propylene.

11. A dye as claimed in claim 1, wherein B has the same meaning as A.

12. A dye as claimed in claim 1, wherein Y is vinyl or $\beta$-sulfatoethyl.

13. A dye as claimed in claim 1, wherein the group of the general formula (4)

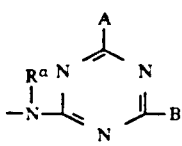

(4)

is a group of the general formula (4A)

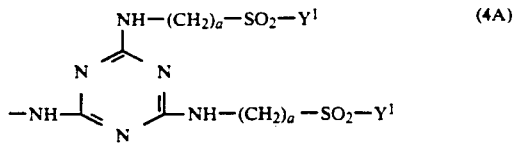

(4A)

where $Y^1$ is vinyl or $\beta$-sulfatoethyl, $\beta$-haloethyl, $\beta$-thiosulfatoethyl, $\beta$-phosphatoethyl or $\beta$-acetoxyethyl, and a is 2 or 3.

14. A dye as claimed in claim 13, wherein a is 3.

15. A dye as claimed in claim 13, wherein $Y^1$ is vinyl, $\beta$-chloroethyl or $\beta$-sulfatoethyl.

16. A dye as claimed in claim 1, wherein $Y^1$ is vinyl, $\beta$-chloroethyl or $\beta$-sulfatoethyl.

17. A dye as claimed in claim 1, wherein $X^1$ and $X^2$ are a direct bond.

18. A dye as claimed in claim 1, wherein G is a branched alkylene of 2 to 4 carbon atoms.

19. A dye as claimed in claim 1, wherein G is a branched alkylene having 2 to 3 carbon atoms.

20. A dye as claimed in claim 1, wherein $R^z$ is an alkylene of 1 to 4 carbon atoms.

21. A dye as claimed in claim 1, wherien n is 1.

* * * * *

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

column 3, line 16, the formula (3a) should read:

-- $(Y-SO_2-X^1)_a-D-N=N-(E-N=N)_v-K-Z$      (3a) --.

In the specification at column 3, line 18, the formula (3b) should read:

-- $Z-D-N=N-(E-N=N)_v-K-X^1-SO_2-Y$      (3b) --.

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

Claim 1 should read as follows:

A dye conforming to the general formula (5b) or (5c)

$$(Y\text{-}SO_2\text{-}X^1)_n\text{—}D^1\text{—}N=N\text{—}(E^1\text{—}N=N)_v\text{—}K^*\text{—}Z \qquad (5b)$$

$$Z\text{—}D^*\text{—}N=N\text{—}(E^1\text{—}N=N)_v\text{—}K^1\text{—}X^2\text{—}SO_2\text{—}Y \qquad (5c)$$

where n      is 1 or 2,

Y      is vinyl, β-sulfatoethyl, β-haloethyl, β-thiosulfatoethyl, β-phosphatoethyl or β-acetoxyethyl, $X^1$      is a direct bond, alkylene of 1 to 4 carbon atoms or the bivalent radical of an alkanoylamido group of 2 to 5 carbon atoms, $D^1$      is a phenylene substituted by substituents $R^2$ and $R^3$ which have the following meanings:

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

$R^2$ is hydrogen, methyl, ethyl, methoxy, ethoxy, alkanoyl of 2 to 5 carbon atoms, cyano, carboxy, sulfo, alkoxycarbonyl of 2 to 5 carbon atoms, carbamoyl, N-($C_1$-$C_4$)carbamoyl, fluorine, chlorine, bromine or trifluoromethyl, $R^3$ is hydrogen, methyl, ethyl, methoxy, ethoxy, cyano, carboxy, sulfo, alkanoylamino of 2 to 5 carbon atoms, alkoxycarbonyl of 2 to 5 carbon atoms, carbamoyl, N-($C_1$-$C_4$)-carbamoyl, fluorine, chlorine, nitro, sulfamoyl, N-($C_1$-$C_4$-alkyl)-sulfamoyl, alkylsulfonyl of 1 to 4 carbon atoms, phenylsulfonyl or phenoxy, $E^1$ is a radical of the general formula (7a), (7b), (7c) or (7d)

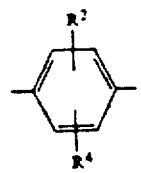
(7a)

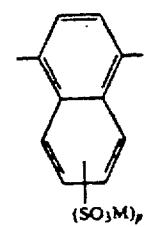
(7b)

UNITED STATES PATENT AND TRADEMARK OFFICE
CERTIFICATE OF CORRECTION

Page 4 of 12

PATENT NO. : 5,138,041
DATED : August 11, 1992
INVENTOR(S) : Buch, et. al.

It is certified that error appears in the above-indentified patent and that said Letters Patent is hereby corrected as shown below:

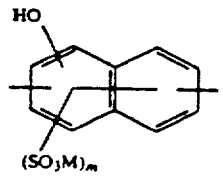 (7c)

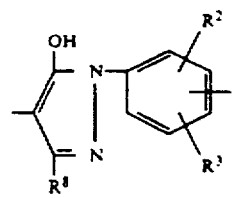 (7d)

where $R^2$ and $R^3$ are each as defined above, $R^4$ is hydrogen, alkyl of 1 to 4 carbon atoms, alkoxy of 1 to 4 carbon atoms, chlorine, alkanoylamino of 2 to 5 carbon atoms, benzoylamino, ureido, N'-phenylureido, N'-alkylureido of 1 to 4 carbon atoms in the alkyl moiety, phenylsulfonyl or alkylsulfonyl of 1 to 4 carbon atoms,

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

M   is hydrogen or an alkali metal, m   is 1 or 2, p   is zero, 1 or 2, $R^8$   is hydrogen, alkyl of 1 to 4 carbon atoms, cyano, carboxy, carbalkoxy of 2 to 5 carbon atoms, carbamoyl or phenyl, v    is zero or 1, —K*—Z    of formula (5b), is a radical of the general formula (8a), (8e) or (8f)

(8a)

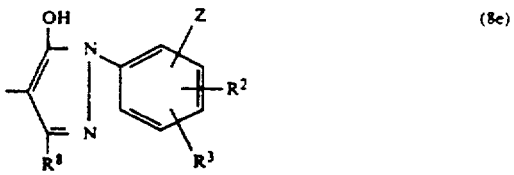

(8e)

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

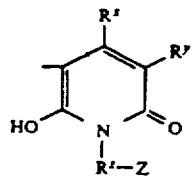
(1̶9̶)

where $R^2$, $R^3$, p and M are each as defined above,

V is a phenylene substituted by $R^2$ and $R^3$ defined above or is a naphthylene unsubstituted or substituted by 1 or 2 sulfo groups, Z is a radical of the general formula (4)

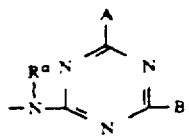
(4)

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

where $R^\alpha$ is hydrogen or straight-chain or branched alkyl of 1 to 4 carbon atoms unsubstituted or substituted by carboxy, sulfo, cyano, hydroxy or chlorine, A is a group of the general formula (2a) or (2b)

  (2a)

  (2b)

where

G is straight-chain or branched alkylene of 1 to 6 carbon atoms, or is an alkylene of 2 to 6 carbon atoms which is interrupted by 1 or 2 groups selected from oxygen and -NH-, the alkylene moieties being straight-

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

chain or branched, or is cycloalkylene of 5 to 8 carbon atoms, unsubstituted or substituted by methyl, R is hydrogen, chlorine, bromine, fluorine, hydroxy, sulfato, cyano, carboxy, carbamoyl, carbalkoxy of 2 to 5 carbon atoms, alkanoyloxy of 2 to 5 carbon atoms, benzoylamino unsubstituted or substituted by 1 to 2 substituents from the group consisting of sulfo, carboxy, methyl, ethyl, methoxy, ethoxy and chlorine, or a group of the general formula $-SO_2-$ $Y^2$ where $Y^2$ has one of the meanings specified above for Y or is $\beta$-hydroxyethyl, $Y^2$ being identical to or different from Y, k is zero, 1 or 2, k* is zero, 1, 2, 3 or 4, X is together with the N-atom the bivalent radical of a heterocyclic containing 1 or 2 alkylene groups of 1 to 5 carbon atoms with or without 1 or 2 hetero atoms selected from nitrogen and oxygen,

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

$Y^1$ has one of the meanings specified above for Y, $Y^1$ being identical to or different from Y, and W is hydrogen, methyl, sulfomethyl, carboxymethyl, straight-chain or branched alkyl of 2 to 6 carbon atoms unsubstituted or substituted by 1 or 2 substituents from the group consisting of methoxy, ethoxy, carboxy, sulfo, hydroxy and halogen, unsubstituted or methyl-substituted cycloalkylene of 5 to 8 carbon atoms, or phenyl unsubstituted or substituted by substituents from the group consisting of alkyl of 1 to 4 carbon atoms, alkoxy of 1 to 4 carbon atoms, carboxy, sulfo and halogen, and B has one of the meanings specified for A, A and B having meanings identical to or different from each other, $R^8$ as defined above, $R^x$ is hydrogen, alkyl of 1 to 4 carbon atoms, or alkyl of 1 to 4 carbon atoms substituted by alkoxy of 1 to 4 carbon atoms or by cyano,

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

$R^y$ is hydrogen, sulfo, sulfoalkyl having an alkylene moiety of 1 to 4 carbon atoms, cyano or carbamoyl, $R^z$ is alkylene of 1 to 6 carbon atoms, phenylene unsubstituted or substituted by substituents from the group consisting of methyl, ethyl, chlorine, carboxy and sulfo, or alkylenephenylene having 2 to 4 carbon atoms in the alkylene moiety, D* is a phenylene radical unsubstituted or substituted by 1 or 2 substituents from the group consisting of hydrogen, methyl, ethyl, methoxy, bromine, chlorine, carboxy and sulfo, or is a naphthylene radical unsubstituted or substituted by 1 or 2 sulfo groups,

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

$K^1$ is a radical of the general formula (9a), (9b) or (9c),

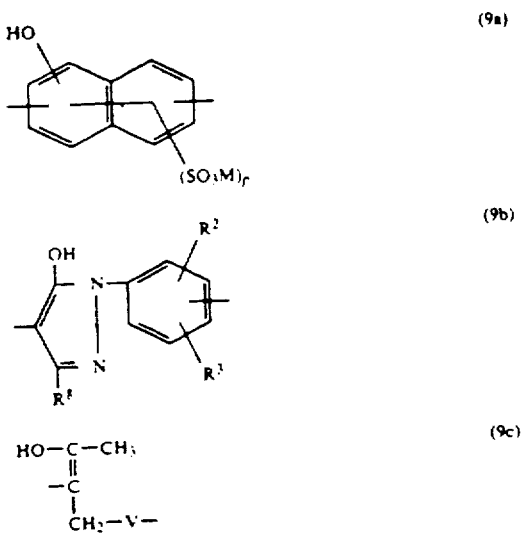

where M, p, V, $R^2$, $R^3$ and $R^8$ are each as defined above and the hydroxy group in the formula (9a) is ortho to the free bond attached to the azo group,

UNITED STATES PATENT AND TRADEMARK OFFICE
CERTIFICATE OF CORRECTION

PATENT NO. : 5,138,041
DATED : August 11, 1992
INVENTOR(S) : Buch, et. al.

It is certified that error appears in the above-indentified patent and that said Letters Patent is hereby corrected as shown below:

$X^2$ is a direct bond, alkylene of 1 to 4 carbon atoms or the bivalent radical of an alkanoylamido group of 2 to 5 carbon atoms.

In claim 2, line 50, formula (5b) should read:

In claim 4, column 40, line 58, the formula (5c) should read

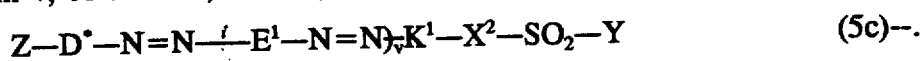

Signed and Sealed this

First Day of November, 1994

BRUCE LEHMAN

*Attest:*

*Attesting Officer*  *Commissioner of Patents and Trademarks*